(12) United States Patent
Ghotbi et al.

(10) Patent No.: US 11,907,272 B2
(45) Date of Patent: Feb. 20, 2024

(54) REAL-TIME PERSONALIZED SUGGESTIONS FOR COMMUNICATIONS BETWEEN PARTICIPANTS

(71) Applicant: Microsoft Technology Licensing, LLC, Redmond, WA (US)

(72) Inventors: Nikrouz Ghotbi, Redmond, WA (US); Eddie Fusaro, Sammamish, WA (US); John Alton Price, Seattle, WA (US); Jeff Roger DeVries, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 15 days.

(21) Appl. No.: 15/435,637

(22) Filed: Feb. 17, 2017

(65) Prior Publication Data

US 2018/0239770 A1    Aug. 23, 2018

(51) Int. Cl.
*G06F 16/332*    (2019.01)
*G06F 16/33*    (2019.01)
(Continued)

(52) U.S. Cl.
CPC ........ *G06F 16/3322* (2019.01); *G06F 3/0482* (2013.01); *G06F 3/0484* (2013.01); *G06F 9/453* (2018.02); *G06F 15/76* (2013.01); *G06F 16/334* (2019.01); *G06F 16/338* (2019.01); *G06Q 10/107* (2013.01); *H04L 51/046* (2013.01); *H04L 67/306* (2013.01)

(58) Field of Classification Search
CPC .... G06F 17/3064; G06F 9/453; G06F 3/0482; G06F 3/0484; G06F 17/30675; G06F 17/30696; G06F 16/3322; G06F 16/334; G06F 16/338; G06F 15/76; H04L 51/046; H04L 67/306; G06Q 10/107
See application file for complete search history.

(56) References Cited

U.S. PATENT DOCUMENTS 8,396,719 B2    3/2013 Patrick et al.
9,015,099 B2    4/2015 Nitz et al.
(Continued)

FOREIGN PATENT DOCUMENTS

CN    102368256 A    3/2012
CN    105068661 A    11/2015
(Continued)

OTHER PUBLICATIONS

Katamreddy, Srudeep, "How smart is Google Allo? Google's new smart messaging app", https://techtrendan.com/google-allo-app/, Published on: 2015, 11 pages.
(Continued)

*Primary Examiner* — Ken Hoang
(74) *Attorney, Agent, or Firm* — SHOOK, HARDY & BACON L.L.P.

(57) ABSTRACT

Disclosed in some examples are methods, systems, machine-readable media, and devices which provide for real-time personalized suggestions for participants in a network-based communication service. The personalized suggestions may include options for taking actions, content suggestions, and smart replies. These suggestions may be based upon the current conversation and are delivered personally to each participant.

20 Claims, 14 Drawing Sheets

(51) Int. Cl.

| | |
|---|---|
| *G06F 16/338* | (2019.01) |
| *G06F 3/0482* | (2013.01) |
| *G06F 3/0484* | (2022.01) |
| *H04L 67/306* | (2022.01) |
| *H04L 51/046* | (2022.01) |
| *G06F 9/451* | (2018.01) |
| *G06F 15/76* | (2006.01) |
| *G06Q 10/107* | (2023.01) |

(56) References Cited

U.S. PATENT DOCUMENTS

| | | | | |
|---|---|---|---|---|
| 9,094,730 | B1* | 7/2015 | Kirmse | H04N 21/41407 |
| 9,754,016 | B1 | 9/2017 | Bozarth et al. | |
| 9,977,595 | B2* | 5/2018 | Choi | G06F 3/04842 |
| 10,043,516 | B2* | 8/2018 | Saddler | G10L 15/1815 |
| 2008/0201434 | A1 | 8/2008 | Holmes et al. | |
| 2009/0235280 | A1 | 9/2009 | Tannier et al. | |
| 2009/0254624 | A1 | 10/2009 | Baudin et al. | |
| 2012/0290662 | A1 | 11/2012 | Weber et al. | |
| 2013/0110520 | A1* | 5/2013 | Cheyer | G10L 15/22 |
| | | | | 704/275 |
| 2013/0297317 | A1 | 11/2013 | Lee et al. | |
| 2014/0181219 | A1 | 6/2014 | Wang et al. | |
| 2014/0214404 | A1 | 7/2014 | Kalla et al. | |
| 2015/0161291 | A1 | 6/2015 | Gur et al. | |
| 2015/0254252 | A1 | 9/2015 | Khalil et al. | |
| 2016/0301639 | A1* | 10/2016 | Liu | G06Q 50/01 |
| 2016/0308794 | A1 | 10/2016 | Kim et al. | |
| 2016/0321283 | A1 | 11/2016 | Shen et al. | |
| 2016/0321573 | A1 | 11/2016 | Vangala et al. | |
| 2016/0335572 | A1* | 11/2016 | Bennett | G06Q 10/06311 |
| 2016/0337295 | A1* | 11/2016 | Bennett | H04L 51/18 |
| 2017/0180276 | A1* | 6/2017 | Gershony | H04L 51/04 |
| 2017/0236131 | A1* | 8/2017 | Nathenson | G06Q 30/0201 |
| | | | | 705/26.7 |
| 2018/0083894 | A1 | 3/2018 | Fung et al. | |
| 2021/0073293 | A1 | 3/2021 | Fenton et al. | |

FOREIGN PATENT DOCUMENTS

| | | | |
|---|---|---|---|
| EP | 3122001 A1 | 1/2017 | |
| WO | 2015106644 A1 | 7/2015 | |
| WO | WO-2016135746 A2 * | 9/2016 | G06F 16/951 |

OTHER PUBLICATIONS

Fingas, Roger, "Inside iOS 10: Upgraded QuickType wields 'Siri intelligence' for contextual suggestions", http://appleinsider.com/articles/16/06/15/inside-ios-10-upgraded-quicktype-wields-siri-intelligence-for-contextual-suggestions, Published on: Jun. 15, 2016, 10 pages.

Bonnington, Christina, "The Smart Inbox Feature You Need Now", Retrieved From: http://web.archive.org/web/20151107021400/http://www.refinery29.com/2015/11/96913/inbox-smart-reply-feature, Nov. 3, 2015, 4 Pages.

Hidinger, et al., "Here's how to render a card using the JavaScript SDK", Retrieved from: https://docs.microsoft.com/en-us/adaptive-cards/sdk/rendering-cards/javascript/render-a-card, Nov. 28, 2017, 3 Pages.

"International Search Report and Written Opinion Issued in PCT Application No. PCT/US18/017145", dated Mar. 26, 2018, 13 Pages.

"Office Action Issued in European Patent Application No. 18706359.9", dated May 12, 2020, 8 Pages.

Gysel, et al., "Reply With: Proactive Recommendation of Email Attachments", In Repository of arXiv:1710.06061v2, Nov. 16, 2017, 10 Pages.

"International Search Report and Written Opinion Issued in PCT Application No. PCT/US20/038009", dated Sep. 25, 2020, 14 Pages.

"Non Final Office Action Issued in U.S. Appl. No. 16/564,612", dated Aug. 18, 2021, 15 Pages.

"Office Action Issued in Indian Patent Application No. 201917032633", dated Jan. 6, 2022, 7 Pages.

"Notice of Allowance Issued in U.S. Appl. No. 16/564,612", dated Mar. 24, 2022, 10 Pages.

"First Office Action and Search report Issued in Chinese Patent Application No. 201880012194.3", 13 Pages.

Bonnington, Christina, "The Smart Inbox Feature You Need NOW", Retrieved from: https://www.refinery29.com/en-us/2015/11/96913/inbox-smart-reply-feature, Nov. 4, 2015, 5 Pages.

"Office Action issued in Chinese Patent Application No. 201880012194.3", dated Apr. 19, 2023, 15 Pages.

"Third Office Action Issued in Chinese Patent Application No. 201880012194.3", dated Aug. 28, 2023, 10 Pages.

* cited by examiner

REAL-TIME PERSONALIZED SUGGESTIONS FOR COMMUNICATIONS BETWEEN PARTICIPANTS

BACKGROUND

Network-based communications services such as online chats offer real-time transmission of communications (e.g., text, photos, videos, voice snippets) between two or more persons through the use of network-accessible computing devices. Other network-based communications include email, phone calls, and the like. Users enter messages into a network-based communication application (e.g., SKYPE® by MICROSOFT®) on their computing devices and the application sends the message to a computing device of the network-based communications service. The network-based communications service then forwards the message to other participants in the network-based communications session via their instance of a network-based communication application. The network-based communications service manages details pertaining to message delivery, addressing, and other details.

SUMMARY

Some examples disclosed herein pertain to network-based communications between two or more persons. Some examples disclosed herein relate to real-time (or near real-time) personalized suggestions as part of a network-based communication between two or more persons. For example, a system may receive text of a network-based communication between first and second users. The system may input the text to a plurality of intent models, each intent model testing the text for a different type of communicative intent. The system may generate a set of personalized suggestions based upon the responses from the intent models and a user profile of the first user. The set of suggestions may be ranked relative to one another based upon a global model and a user model, the user model specific to the first user. A first and a second suggestion may be selected from the set of suggestions based upon the ranking, the first and second suggestions being different suggestion types and sent to the first device for presentation to the first user. Other aspects of the invention will be apparent on reading the following detailed description of the invention and viewing the drawings that form a part thereof.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
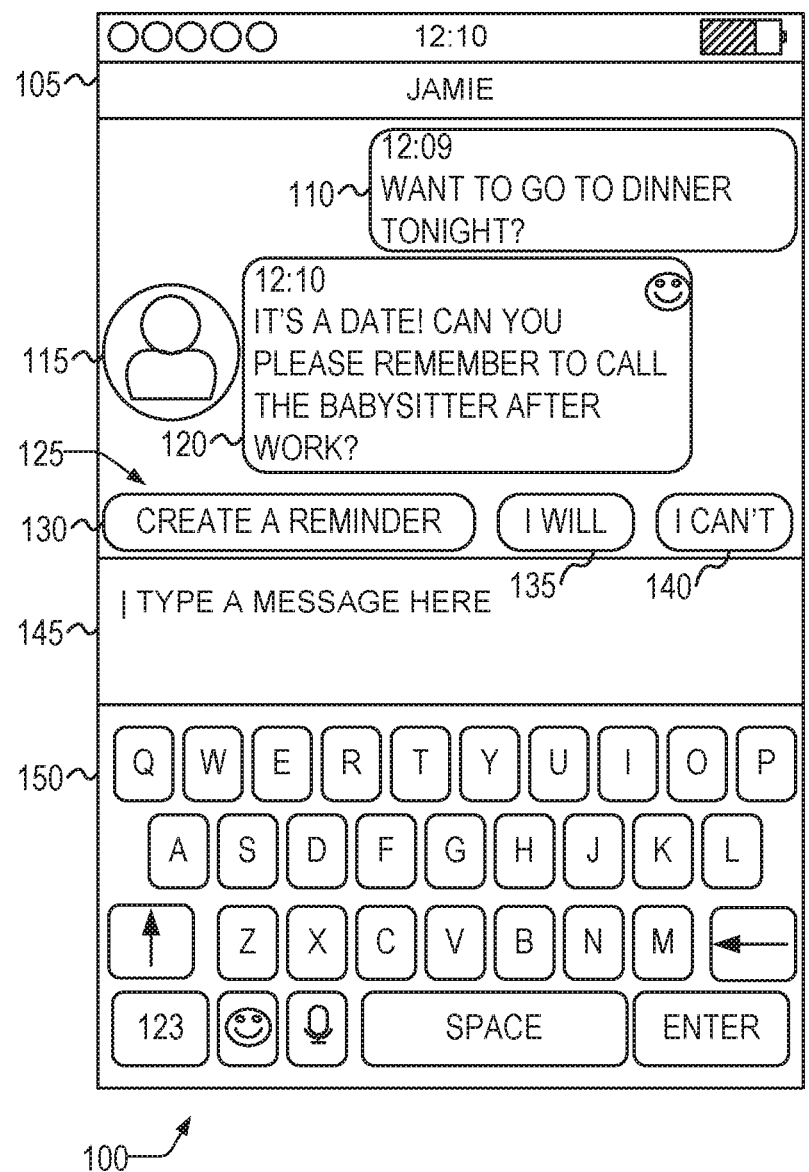
FIGS. 1-7 show diagrams of Graphical User Interfaces (GUI) produced by a network-based communications application of a network-based communications service according to some examples of the present disclosure.

Network-based communication services allow for quick and frequent communications between people. Individuals often discuss topics and interests that they have with each other. During conversations it can be distracting and cumbersome to participants when they need to leave the user experience of the network-based communications application to perform one or more tasks related to their communication session. One of the primary user problems is the difficulty of task switching on devices and the cognitive load of context switching. For example, if two friends are communicating using the network-based communications service and discussing going to a movie, it may be distracting, difficult, and inconvenient to leave the user experience of the network-based communications application to check their calendar, find show times of movies nearby they like, purchase tickets, and so on.

Disclosed in some examples are methods, systems, machine-readable media, and devices that deliver personalized suggestions for participants in a network-based communication session. These personalized suggestions are delivered to the user's network-based communications application and comprise options for taking actions, content suggestions, and smart replies. These personalized suggestions prevent the user from having to leave the user experience of the network-based communications application. The suggestions may be based upon the current conversation and are delivered personally to each participant. That is, the suggestions delivered to one party of the conversation are personal to that party. Each party may therefore have their own different personalized suggestions delivered throughout the conversation.

For example, if the conversation is about movies, the suggestions delivered to a first party of the conversation may deliver movie times for movies that align with interests of the first party, whereas the suggestions delivered to a second party of the conversation may deliver movie times for different movies that align with the different interests of the second party. The interests of a particular user may be learned over time from interactions with the network-based communication service and other applications on one or more computing systems of the user. This contrasts with personalized suggestion services which have one personalization "assistant" for a particular conversation that provides the same suggestions for all parties.

Suggestions may be generated based upon a number of different models that determine the communicative intent of a message from the conversation. Each model therefore is specifically tailored to detect different types of intent. The intent models may return one or more determined intents. Suggestions may be determined from these intents and the suggestions are then ranked in order of the system's perceived importance to the user. Having a number of different models Where each model is customized for detecting certain kinds of intents may be more accurate than general models that try and discern all possible intents.

Suggestions may be ranked based upon previous interactions with previously delivered suggestions. The ranking may utilize heuristics, a system-wide model, and a user-based model. The rankings may be based upon the type of suggestion. For example, if a user has previously shown lots of interest in content suggestions, but less interest in action suggestions, the system may prioritize content suggestions over action suggestions. The ranking may also be based upon the suggestion itself. For example, the user may have previously shown lots of interest in restaurant suggestions, but less interest in movie suggestions. In this example, the system may prioritize restaurant suggestions over movie suggestions.

The personalized suggestions may be delivered through a personal digital assistant (e.g., such as CORTANA® from MICROSOFT®). While new suggestions are created based upon new messages that arrive, old suggestions may also be persisted for a period of time so as to give users time (especially in a fast-moving conversation) to select a particular suggestion before that suggestion is replaced (e.g., deprecated).

To protect user privacy, Graphical User Interfaces (GUIs) for user consent and opt-in or opt-out may be provided to allow users to assent to, or restrict, the collection of personal information. In some examples, these GUIs may allow users to delete previously collected information or set restrictions on the types and content of information collected.

Turning now to FIG. 1, a diagram of a GUI 100 produced by a network-based communications application of a network-based communications service is shown according to some examples of the present disclosure. Information bar 105 identifies the parties to the conversation—in this case Jamie. Message bubble 110 conveys the user's message to Jamie offering a dinner out. Avatar 115 may show a small picture or other icon to accompany responses from Jamie. Jamie's message in reply is shown in message bubble 120 accepting dinner, but asking that the user call the babysitter after work. The system detects Jamie's message and provides some personalized suggestions using GUI elements in a personalized suggestion area 125. In some examples, the GUI elements containing the suggestions may be buttons. In some examples, the GUI elements containing the suggestions may be given a bounded area of the screen and the system may select suggestions such that the suggestions fit onto the screen. For example, as shown in FIG. 1, a single row of suggestions is shown, including suggestions 130, 135, and 140.

Figure 2:
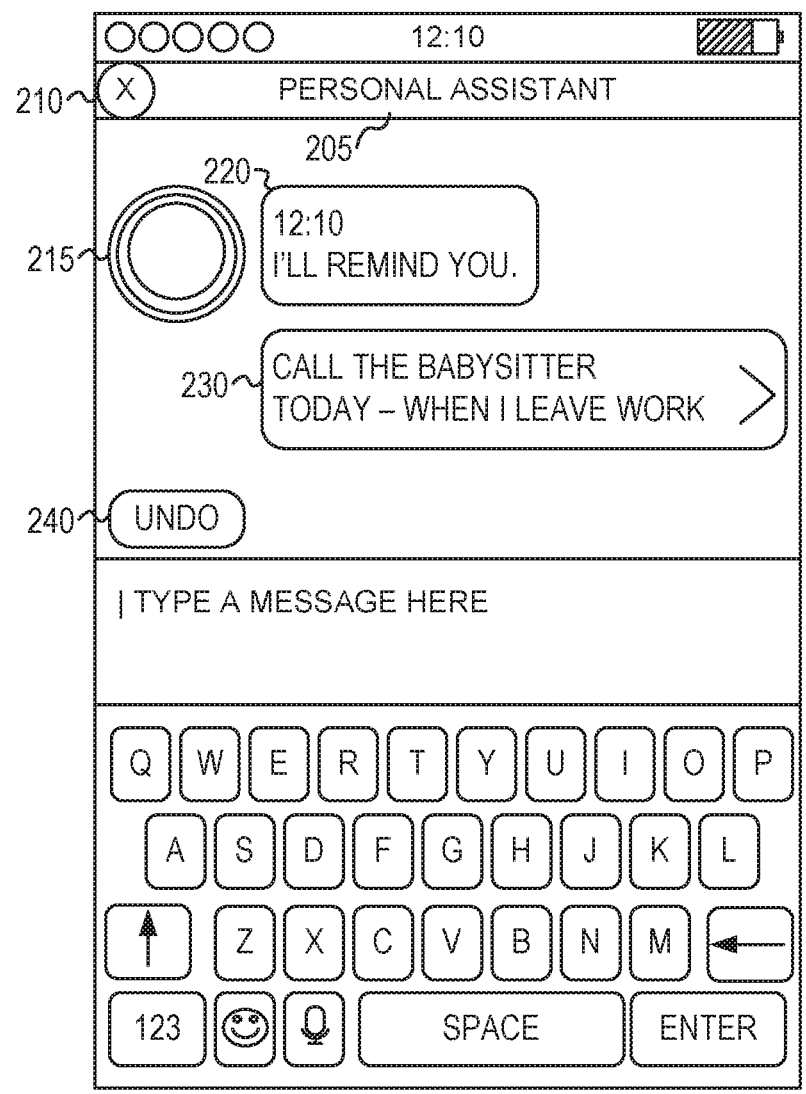

Suggestion 130 is an action suggestion offering to create a reminder to call the babysitter after work. If suggestion 130 is selected, the user may be taken to a GUI screen such as shown in FIG. 2. Suggestion 135 is a smart reply suggestion that, when selected, sends a message saying "I will" to Jamie. Suggestion 140 is also a smart reply suggestion that, when selected, sends a message saying "I can't" to Jamie. Text entry display 145 shows messages as they are entered using on-screen keyboard 150 (e.g., touch keyboard). Although a mobile computing device GUI is shown, one of ordinary skill in the art with the benefit of this disclosure will appreciate that other GUIs for other device types may include similar features as shown in FIG. 1 as well as features shown in FIGS. 2-7.

Turning now to FIG. 2, a diagram of a GUI 200 produced by a network-based communications application of a network-based communications service is shown according to some examples of the present disclosure. GUI 200 may be displayed upon selection of the "create a reminder" suggestion 130 from FIG. 1. The communication interface may be automatically switched from communicating with the other person (e.g., Jamie) to communicating with a personal digital assistant (e.g., MICROSOFT® CORTANA®). This is signaled by changing the information bar 205 to indicate the "PERSONAL ASSISTANT" is now who the user is communicating with. Window close button 210 allows the user to close the conversation with the personal digital assistant and return to the conversation with the other person. While the user is communicating with the personal digital assistant, the previous network-based communication session may be kept active (e.g., the communication with Jamie from FIG. 1 would not end). Personal digital assistant avatar 215 also signals to the user that the conversation is with the personal digital assistant. Action message 220 shows the time the action was taken (12:10) and the type of action (a reminder), Details message 230 shows details about the action—e.g., the reminder text, and when the reminder is displayed. Undo button 240 allows the reminder to be undone. In some examples, the user need not enter any other input (the reminder is now set). In other examples, the user may have to enter an input signifying a confirmation.

Figure 3:
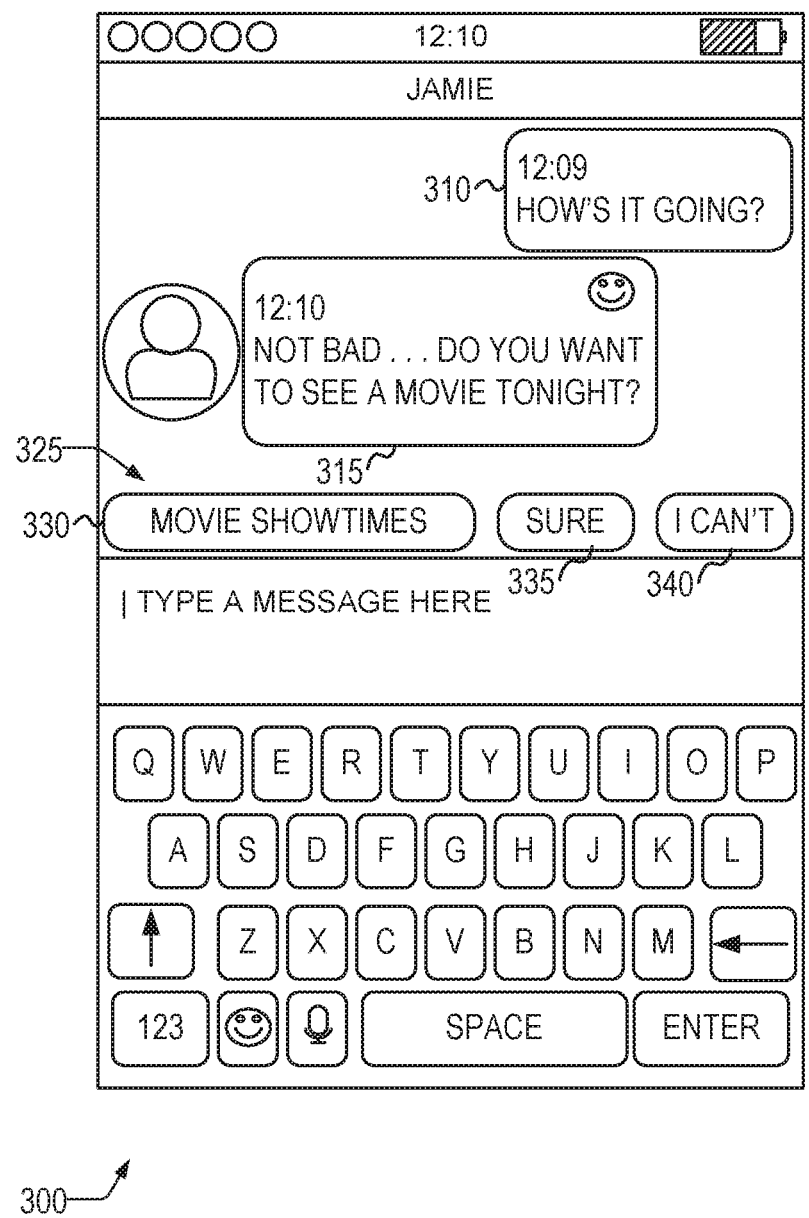

Turning now to FIG. 3, a diagram of a GUI 300 produced by a network-based communications application of a network-based communications service is shown according to some examples of the present disclosure. The user has sent a message, displayed in message bubble 310, saying "How's it going?" to Jamie. Jamie has replied with a message displayed in message bubble 315 saying "Not bad ... do you want to see a movie tonight?" The system detects that the intent behind this statement is that the participants are interested in movies. Suggestion area 325 contains three suggestions: Content suggestion 330 offering to display movie times, smart reply suggestion 335 "Sure," and smart reply suggestion "I can't" 340. Selection of the movie show times content suggestion 330 displays a GUI such as GUI 400 of FIG. 4.

Figure 4:
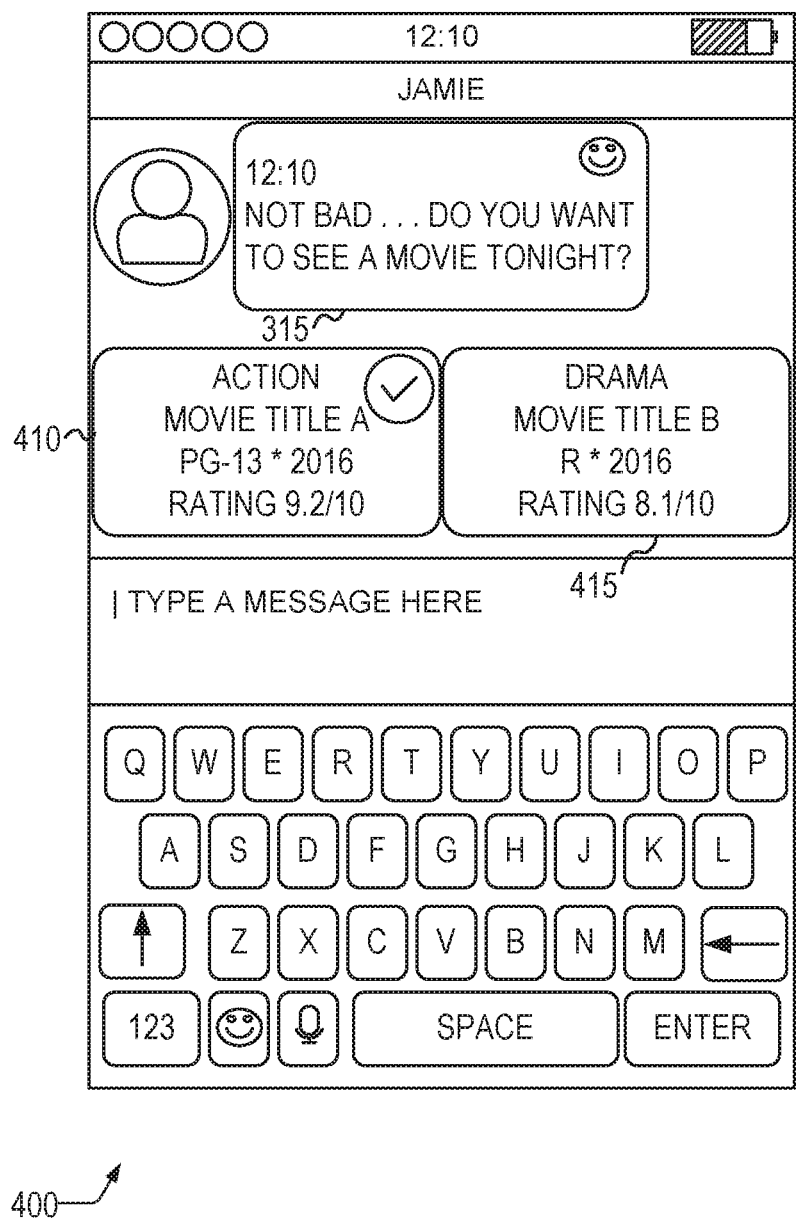

Turning now to FIG. 4, a diagram of a GUI 400 produced by a network-based communications application of a network-based communications service is shown according to some examples of the present disclosure. The message bubble 315 from Jamie is scrolled upwards in the GUI and two movie suggestions, 410 and 415 are displayed in-line with the conversation. In the example of FIG. 4, the genre of the movie ("Action," "Drama") is displayed along with the title ("MOVIE TITLE A," and "MOVIE TITLE B"), the rating ("PG-13", "R"), the release year ("2016"), and a rating as determined by a network-based movie rating site. In other examples, other information may be presented, such as a link to a preview, a preview video (playable in the network-based communication application), a synopsis, a link to purchase tickets, show times for nearby theatres, or the like.

These movies are suggested based upon a user profile. For example, the profile of the user may have indicated that the user likes action movies and so the movie suggestions that are action movies may be prioritized (e.g., with the highest priority suggestions on the left to lowest priority on the right). The profile may be only for the network-based communication service, or may be for other applications as well as the network-based communication service. For example, a personal digital assistant such as CORTANA® may learn user preferences across multiple software products and computing devices. Example information in the user's profile includes the user's current location, the user's schedule (e.g., for movie times), a user's preferred movie genre, maximum rating (e.g., not displaying "R" rated movies for underage users), restaurant preferences, other preferences, and the like. In some examples, the suggestions may be interactive. For example, selecting a movie will show additional information such as show times, local theatres, and the like.

Figure 5:
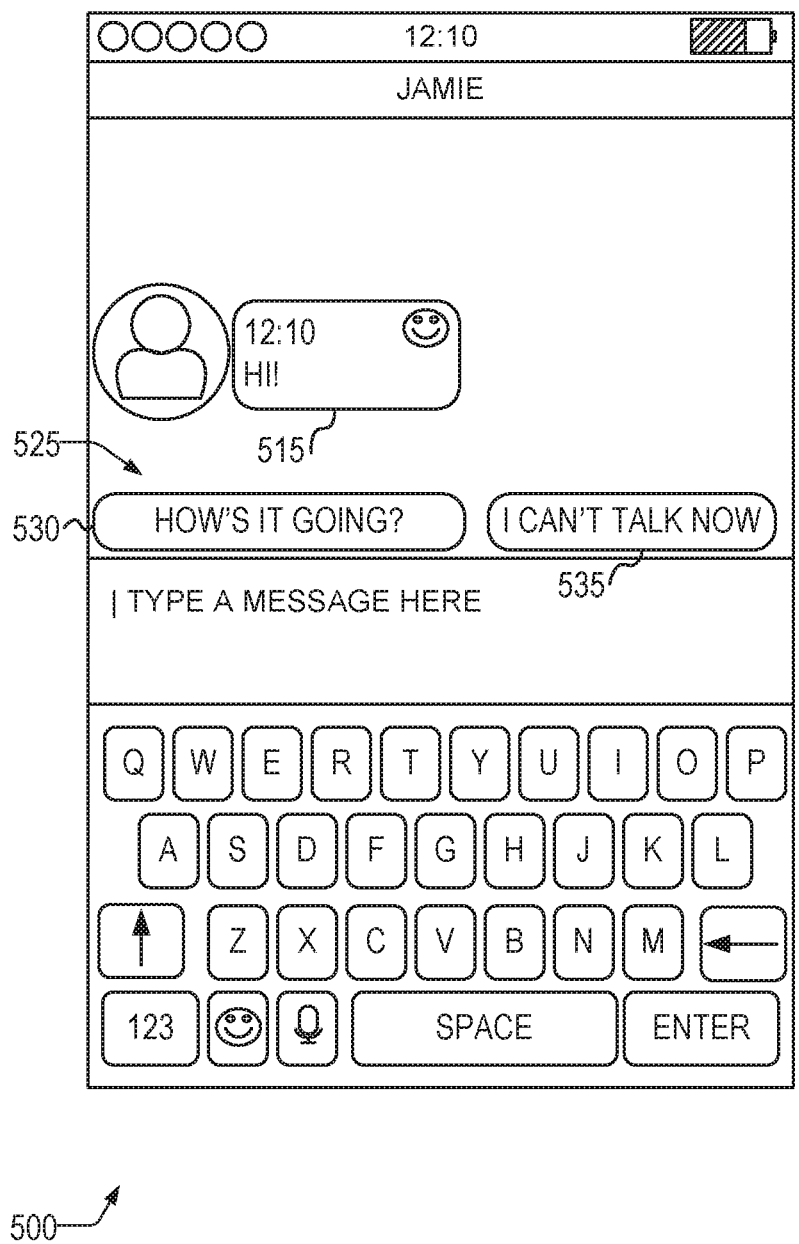

Turning now to FIG. 5, a diagram of a GUI 500 produced by a network-based communications application of a network-based communications service is shown according to some examples of the present disclosure. Jamie has sent the user a message displayed in message bubble 515 saying "Hi!" The system has determined suggestions in suggestion area 525 that are smart replies. Smart reply 530 is a message saying "How's it Going?" Smart reply 535 is a message saying "I Can't Talk Now." Selecting one of the smart reply options will send the corresponding smart reply message to the other users in the communication session. Smart reply text may be determined based upon commonly used responses to the message sent by one of the other participants. The smart reply text may be based upon the user's schedule and current activity. For example, if the user is currently busy (based upon his schedule or computing activity), the smart reply "I Can't Talk Now" may be generated and in some examples prioritized higher than other smart replies.

Figure 6:
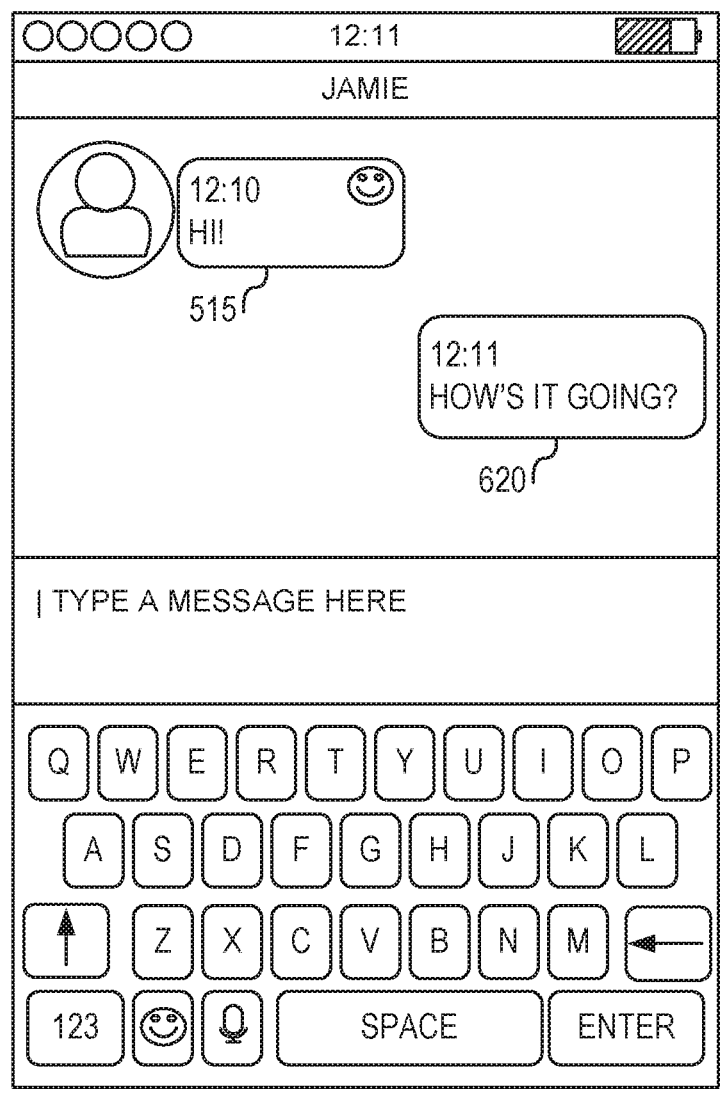

Turning now to FIG. 6, a diagram of a GUI 600 produced by a network-based communications application of a network-based communications service is shown according to some examples of the present disclosure. FIG. 6 is a modified GUI of FIG. 5 where the user has selected the "How's it Going?" smart reply 530. Jamie's message displayed in message bubble 515 is scrolled up in the visible window and the smart reply is shown as a sent message bubble 620.

Figure 7:
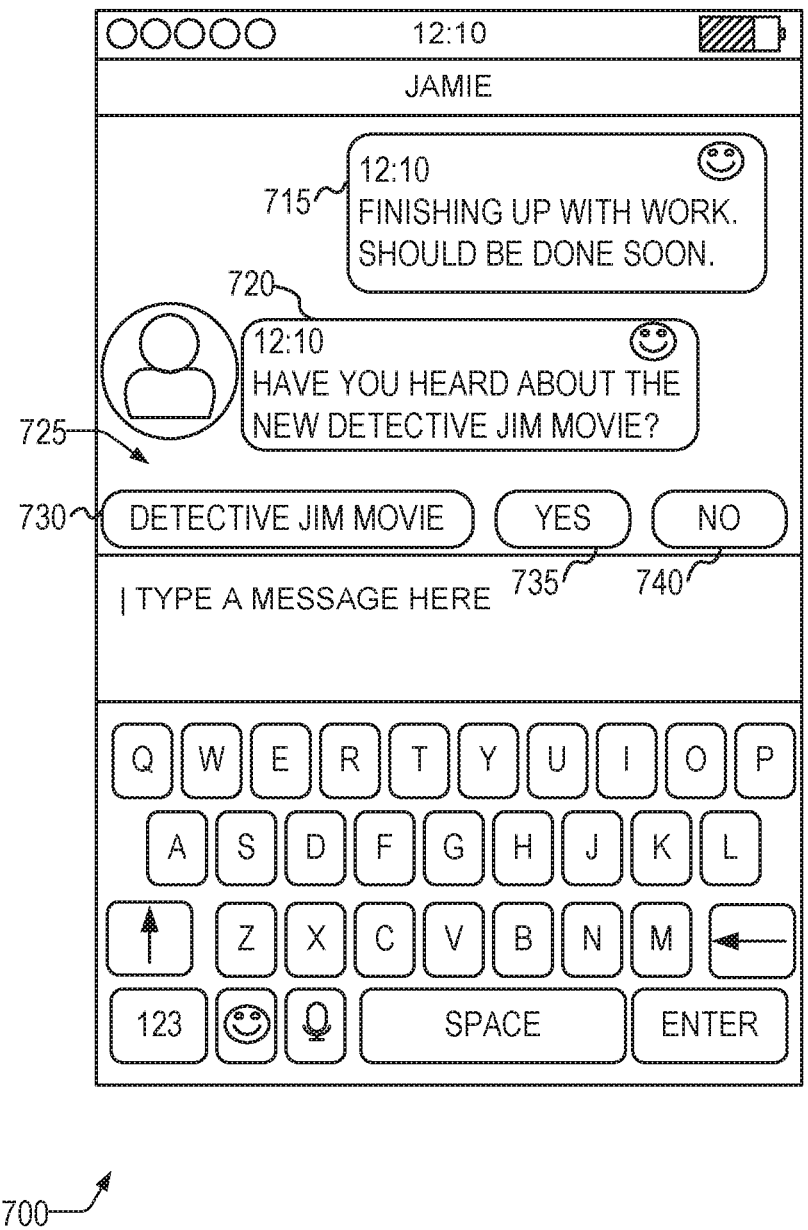

Turning now to FIG. 7, a diagram of a GUI 700 produced by a network-based communications application of a network-based communications service is shown according to some examples of the present disclosure. The user sends the message to Jamie, shown in message bubble 715, that the user is "Finishing up with work. Should be done soon." Jamie has replied with a message, displayed in message bubble 720, asking whether the user has heard about a new movie ("Detective Jim"). The system has determined that "Detective Jim" is a movie and has determined that it has information about the movie to share with the user. Suggestions shown in suggestion area 725 include: suggestion 730, which is a content suggestion that if selected will show information describing the "Detective Jim Movie;" smart reply suggestion 735 which is a "YES" message; and smart reply 740 which is a "NO" message. Selecting suggestion 730 will display information about the movie (e.g., in one example, inline as in FIG. 4, but in other examples, in another window, as in FIG. 2).

As can be appreciated from the previous GUI diagrams, the system may suggest multiple suggestions of different types simultaneously. For example, an action suggestion simultaneous with a content suggestion and a smart reply. Additionally, as can be appreciated, these suggestions may be sorted based upon a personalized order the system perceives as most relevant to the user. This order may be customized based upon feedback from all users of the system, as well as feedback received from each individual user that is used to individually customize that user's experience. Furthermore, as previously stated, these suggestions may only appear for the user, but not for other users in the communication session. Additionally, suggestions may be persisted for several messages to give the user an opportunity to accept them before they are removed.

The system may provide the suggestions without user input or user activation apart from communications sent or received as part of the ongoing conversation. For example, the system may provide personalized suggestions for each participant in a conversation without being asked by the user to provide the suggestions or assistance (although various privacy settings may allow the user to turn off or restrict the suggestions). In some examples, interactions with the personal assistant may be presented in a separate conversation window GUI that is styled as a conversation between the personal assistant (e.g., CORTANA) and the user. For example, as demonstrated in FIG. 2. This private conversation is not viewable or discernable to the other participants in the main conversation.

Figure 8:
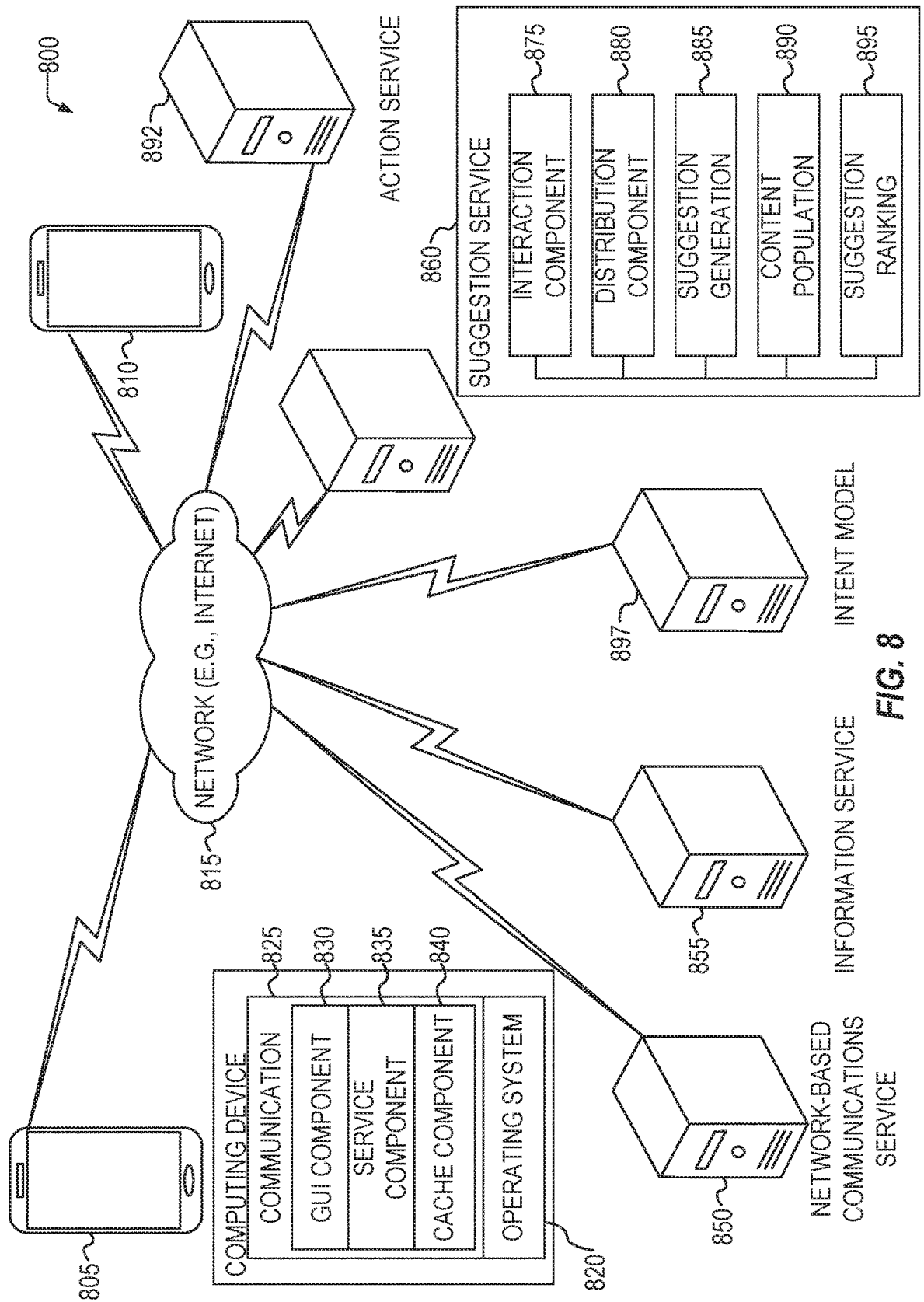
FIG. 8 shows a system diagram of the network-based communications system with personalized suggestions according to some examples of the present disclosure.

Turning now to FIG. 8, a system diagram of the network-based communications system with personalized suggestions 800 is shown according to some examples of the present disclosure. The components of FIG. 8 may be configured to communicate with each other, for example, via a network coupling (such as network 815), shared memory, a bus, a switch, and the like. It will be appreciated that each component may be implemented as a single component, combined into other components, or further subdivided into multiple components. Any one or more of the components described herein may be implemented using hardware (e.g., a processor of a machine) or a combination of hardware and software (for example machine 1400 of FIG. 14). For example, while the figure shows the network-based communications service 850, information service 855, suggestion service 860, action service 892, and intent models 897 as separate computing devices in communication with each other through network 815, the functionality of those components may be implemented by the same computing device, or by different computing devices connected through a different network (e.g., a local area network LAN) than network 815.

Computing devices 805 and 810 (shown as mobile devices such as smart phones) may include an instance of an operating system 820 and a communication application 825. Operating system 820 may provide one or more services to applications, such as a communication application 825. Services may include memory management, scheduling, multi-tasking, notifications, interrupts, event notifications, hardware interfaces, and the like. Communication application 825 may be a network-based communication application and may include a GUI component 830, service component 835, and cache component 840. GUI component 830 may render one or more GUIs, for example, GUIs such as those shown in FIGS. 1-7.

Service component 835 may connect to the network-based communications service 850 and may send messages entered by the user of the computing device 805 via the GUI provided by the GUI component 830 to one or more other users of the network-based communications service 850. Service component 835 may receive one or more other messages from other users through the network-based communications service 850 and may cause those communications to be displayed in the GUI provided by the GUI component 830. Service component 835 may also receive one or more suggestions from the suggestion service 860 and may cause the suggestions to be displayed via the GUI provided by the GUI component 830. Additionally, user input on a suggestion may be sent by the service component 835 to the suggestion service 860. For example, an indication that the user interacted with a suggestion. This allows the suggestion service to take an action on behalf of the user, send additional content or information (that may have been requested by the user), and to customize suggestion rankings for the user. As a result, additional information, content, or interactions may be sent by the suggestion service 860. The service component 835 may cause this additional information to be displayed in a GUI provided by GUI component 830. In other examples, information needed for the interactions are sent by the suggestion service 860 along with the suggestion. The suggestion may comprise the suggestion that is initially displayed (e.g., "DETECTIVE JIM MOVIE" 730 from FIG. 7), and when selected, the additional information already sent by the suggestion service 860 may then be displayed.

Cache component 840 may cache the communications and the suggestions and allow users to review the past communications and past suggestions. Users may select or activate the past suggestions at any time while their communication session is active. In some examples, the cache component may allow for reviewing past communications and suggestions and activating those suggestions at any time.

Network-based communications service 850 may receive communications from computing devices and route those communications to other computing devices participating in the network-based communication session. For example, a communication from computing device 805 may be routed to computing device 810 if computing device 810 and computing device 805 are in a communications session together. Additionally, network-based communications service 850 may route a copy of these communications to suggestion service 860. Suggestions from suggestion service 860 may be routed directly to participants in the communication session, or through the network-based communications service 850.

Suggestion service 860 may receive communications from service component 835 or from the network-based communications service 850 and may generate one or more suggestions and return those suggestions to the computing devices in the communication session. These suggestions may be personalized for each user and thus, suggestions given computing device 805 may be different than suggestions given computing device 810 given the same communication messages. Suggestions may be personalized based upon a user profile stored at the computing device or a network-based profile service (e.g., a network based computing device storing a plurality of user profiles to provide for inter-computing device knowledge of the profiles).

Suggestion service 860 may include a distribution component 880. Distribution component may distribute the communications received from the network-based communications service 850 to one or more intent models, such as intent model 897. Intent model 897 determines, based upon a model, a communicative intent of the message. That is, the intent model 897 may determine one or more meanings of the message. The intent model 897 may determine intent based upon rules—e.g., heuristics such as determining intent based upon the presence of one or more particular keywords. In other examples, the intent model 897 may be an unsupervised or supervised machine learning model. Examples include natural language processing, decision trees, random forests, support vector machines, and the like. An example intent model is described in U.S. application Ser. No. 14/714,137 entitled "Automatic extraction of commitments and requests from communications and content," filed on May 15, 2015 and U.S. application Ser. No. 14/714,109 entitled "Management of commitments and requests extracted. from communications and content," filed on May 15, 2015, both of which are incorporated herein by reference in their entirety. In some examples, the communication may be sent to multiple intent models, each of which is designed to determine a different intent or a different type of intent. In some examples the communication may be sent to multiple intent models, each of which is a different type of model; that is, one model might be rule based, another might be a machine learning model.

Intent models 897 may respond with one or more calculated communicative intents. Each intent model 897 may be trained and/or designed to detect certain types of intent. For example, one model may be trained for a first type of intent and a second model may be trained for a second type of intent. For example, one model may be designed to detect intent to be reminded about a task. Another model may be designed to detect intent to get information about or reserve a table at a restaurant. Other examples include information about movies, directions, ride sharing or taxi services, share an address, determine details about an entity (e.g., a person, place, or thing), or add a contact. By providing the communication to a number of specially trained models looking for specific intents, the system can more accurately determine user intent than providing the communication to a general model.

In some examples, intent models 897 may not respond if the communication does not produce an intent that is above a certainty threshold. However, multiple models may respond with a calculated intent. Suggestion generation component 885 may then generate suggestions for each intent returned by the models. Suggestions may be categorized as actions (e.g., setting a calendar reminder, making reservations, and the like), content suggestions (providing information about an entity, a movie, restaurants, and the like), smart replies (e.g., providing contextual text replies to the analyzed message), and the like. Example action suggestions include opening a document, setting a calendar reminder, calling a phone number, going to a website, sending a text (at a particular time to a particular contact), setting an alarm (e.g., a wake up alarm), purchasing a product, obtaining a ride (e.g., through a ride dispatch application), making restaurant reservations, opening a document, and the like. Example content suggestions may include providing information on an entity (e.g., a company, store, movie, book, restaurant), showing a document, showing a video, showing an audio clip, showing a picture, and the like. Example smart replies include short text, emoji's, pictures, videos, audio clips, and the like.

Suggestion generation may be done based upon one or more if-then-else rule sets that generate suggestions based upon the returned intents. For example, if the returned intent is that the user is discussing a particular entity, then the suggestion may be more information on the entity. As another example, if the returned intent is that the user wishes to be reminded of something, then the suggestion is a calendar reminder. Other methods of converting the intents to suggestions may be utilized such as decision trees, random forests, and the like.

Content population component 890 may populate the suggestions with content from one or more sources, such as information service 855 (e.g., a movie time service, a calendar service, a restaurant service, a search engine, a website, or other database). Content population component 890 may utilize one or more Application Programming Interfaces (API)s to communicate with these services. The content population component may utilize a user profile of the user. For example, if the suggestion is movie times near the user, the content population tool may use a location of the user as stated in the user profile to contact a movie information service to provide show times near the user. Other preferences of the user in the user profile may be utilized to populate content. For example, a user's restaurant preferences may be utilized to select various nearby restaurants when suggesting local restaurants. In some examples, the preferences of the user may be learned by one or more services (e.g., search services, the communications service, the suggestion service, or other services) and stored in the user profile. For example, preferences for movies (action movies, drama movies, etc.) or other preferences may be utilized to filter or customize the populated content. This allows the suggestions to be personalized to the user's likes and dislikes. For example, the system may learn that the user is a vegetarian, and may suggest local vegetarian restaurants.

Suggestion ranking component 895 may rank the suggestions that were determined by suggestion generation component 885. Suggestion ranking component may have rules that specify rankings. For example, the system may rank action suggestions ahead of content suggestions, and content suggestions ahead of smart replies. Other example heuristics may also be utilized. For example, heuristics that take into account the actual subject of the suggestion For example, calendar action suggestions may be ahead of purchase action suggestions and so on. In some examples, the heuristics may be adjusted based upon feedback from all users of the suggestion service 860. For example, if users typically interact with (e.g., select) the smart replies more than the content suggestions, the smart replies may be prioritized over the content suggestions. Thus, by using feedback, a global user model may adjust the heuristics to better meet user needs.

In some examples, in addition to a global user model, each user may have a learned preference for certain types of suggestions. Thus, even though the global model may determine that the larger population of users interact with the action suggestions more than the smart replies, and smart replies more than content suggestions, if a particular user likes smart replies more than action suggestions, smart replies may be prioritized over other suggestion types. Example global and user models may include neural networks, decision trees, random forests, regression algorithms, and the like.

In some examples, the three models (heuristic model, global model, individual model) may be combined such that the models may have a hierarchy. Thus, the individual model may control, unless there is insufficient personal interaction data, in which case the global model will control, unless there is insufficient global interaction data, in which case heuristics are utilized. In other examples, each model may contribute to the final ranking. For example, each model may assign a fixed amount of points to each suggestion according to the rules of the model. Each suggestion may then be scored by using a weighted summation combining the point values for each suggestion according to each model. Each model may be weighted according to a perceived accuracy of the model to the user's preferences. For example, the individual model may be weighted greater than the global model, and both may be weighted higher than the heuristic model. Weights may change dynamically over time based upon user feedback in the form of explicit feedback— e.g., a GUI element indicating satisfaction or dissatisfaction with a suggestion or based upon implicit feedback in the form of interactions with suggestions (interaction with a suggestion signifying satisfaction).

Rankings may be calculated based upon the type of suggestion (action vs. content vs. smart reply), but also may be ranked based upon the actual suggestion content. For example, if the intent is determined to be an expressed interest in a restaurant, suggestions may be: 1.) make a reservation 2.) schedule an appointment or a reminder and 3.) provide more information on the restaurant. All three are action suggestions, but these suggestions may be ranked based upon preferences for these specific actions.

Interaction component 875 handles user interactions with suggestions by sending additional information (such as content determined by the content population component 890), communicating with action services 890 to carry out an action suggestion, and the like. Action services 892 may be calendar services, restaurant reservation services, taxi dispatch services, and other action services.

Figure 9:
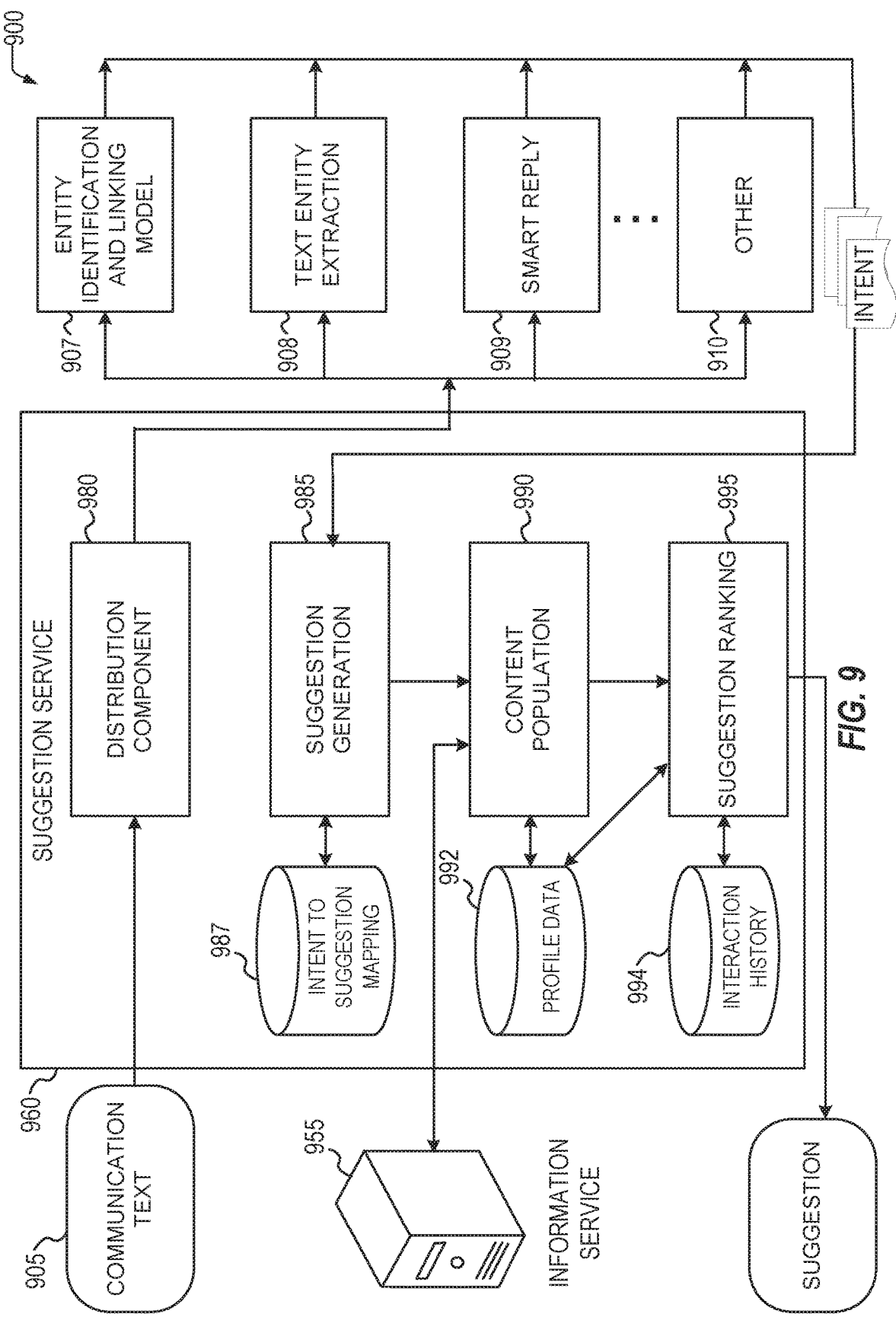
FIG. 9 shows a data flow of generating a suggestion according to some examples of the present disclosure.

Turning now to FIG. 9, a data flow of a suggestion generation 900 is shown according to some examples of the present disclosure. Suggestion service 960 may be an example of suggestion service 860. In some examples, distribution component 980 may be an example of distribution component 880. In some examples, suggestion generation component 985 may be an example of suggestion generation component 885. In some examples, content population component 990 may be an example of content population component 890. In some examples suggestion ranking component 995 may be an example of suggestion ranking component 895. As noted above with respect to FIG. 8, all, or some, of the components are configured to communicate with each other, for example, via a network coupling, shared memory, a bus, a switch, and the like. It will be appreciated that each component may be implemented as a single component, combined into other components, or further subdivided into multiple components. Any one or more of the components described herein may be implemented using hardware (e.g., a processor of a machine) or a combination of hardware and software.

Communication text 905 (which may include text, emoji, photos, etc.) from a communication session is handled by the distribution component 980. Distribution component 980 inputs the communication text 905 to one or more intent models 907-910. For example, entity identification and linking model 907 which may identify entities referenced within the communication text 905 and determine whether the user intended to refer to that entity (and in some examples returns information about the entity). Text entity extraction model 908 may determine from the communication text 905 whether the user intended to set a reminder, a calendar event, a meeting request, restaurant reservations, or the like (and in some examples parses the communication text 905 to determine details about the reminder). Smart reply model 909 determines if a smart reply text is indicated (and in some examples, determines the smart reply text).

As noted in FIG. 9, any number of other models may be utilized to determine intent, such as other model 910. The models 907-910 may be implemented as part of suggestion service 960, or may be separate services in communication with the suggestion service 960. As previously noted, the models may be machine learning models, including supervised or unsupervised learning models. Examples include neural networks, regression, natural language processing, random forest, decision tree, decision jungle, or other models. Models may interact with action services, such as action service 892 of FIG. 8 to determine one or more properties of the user in order to better determine intent. For example, the action service may be a calendar service (e.g., MICROSOFT OUTLOOK®) that may keep track of a user's appointments and meetings. The models may consult the calendar service to determine if a particular intent is compatible with properties (e.g., the user's schedule) of the user. For example, if the user is already busy, then a smart reply of "I'm busy" may be appropriate.

The suggestion generation component 985 receives the determined intents and maps them to suggestions. Returned intents may include content as well as or instead of semantic meanings, such as text for smart replies, and the like. For example, the suggestion generation component 985 uses a database, such as an intent to suggestion mapping 987, which may contain possible intents and an indication of the corresponding suggestion. For example, a calendar entry intent may have a corresponding calendar entry suggestion. In other examples, rather than a table, the intent to suggestion mapping 987 may be rule based, with if-then statements that are evaluated against the value of the intent to determine the suggestion. For example: if intent is to create a calendar entry, then the corresponding suggestion is to create a calendar entry. More than one suggestion may be created from a single intent.

Suggestion generation component 985 may interact with action services, such as action service 892 of FIG. 8 to determine one or more properties of the user. For example, the action service may be a calendar service (e.g., MICROSOFT OUTLOOK®) that may keep track of a user's appointments and meetings. The suggestion generation component 985 may consult the calendar service to determine if the suggestion is compatible with properties (e.g., the user's schedule) of the user. For example, if the user is already busy, then a suggestion that the user see a movie might trigger a suggestion that the user is busy. In some examples, the models, such as the smart reply model 909 may also consult with external services. For example, if the user is already busy for dinner, the smart reply model may return a smart reply that may indicate that the user is declining an invitation to go to dinner because they are busy.

Content population component 990 may take the suggestions and populate content in the suggestions. For example, by contacting an information service 955. Content population may also utilize profile data 992 of the user. Profile data 992 may be obtained based upon previous usage of the suggestion service 960 and may include action preferences, content preferences, location information, and the like. For example, the profile data 992 may include a user's movie preferences, restaurant preferences, transportation preferences, and the like. The profile data 992 may be context specific, such that it stores preferences for varying contexts of the user. For example, it may store that the user prefers Indian restaurants on Saturday nights, but does not like to eat Indian food on Friday nights. The system may then populate a suggestion of local restaurants with information on Indian restaurants on Saturday nights, but another restaurant type on Friday nights.

In some examples, the intent that is returned by the models already has some content, such as a parsing of the communication text 905. For example, the text entity extraction model 908 may parse out a date and time for a reminder when it determines the intent is to set a reminder. Content population component 990 may utilize this information to populate the suggestion with the date and time of the reminder. In other examples, the content population component 990 may itself analyze the communication text 905 using natural language processing techniques to determine content based upon the intent and the suggestion.

Suggestion ranking component 995 may rank the suggestions and select a set of one or more (or all) of the suggestions to send to the computing device of the user. As noted, the suggestion ranking component 995 may consult both user profile data 992 and interaction history 994 to rank the suggestions relative to each other based upon a global model that is built using interactions of all users with all suggestions for all communication sessions analyzed by the suggestion service 960, as well as an individual model that is built using interactions of the current user with the suggestions for all communications sessions for that user.

The suggestion ranking component 995 may suggest all the suggestions or may select a subset of suggestions to send to the user's computing device based upon the ranking. For example, the suggestion ranking component 995 may select a top predetermined number or percentage of high ranking suggestions e.g., top three, or top 10%) and send them to the computing device of the user. In other examples, the suggestion ranking component 995 may determine a screen size of the user's computing device. The suggestion ranking component 995 may select a set of suggestions to send to the user's computing device that maximizes a total utility of suggestions considering constraints on the length of the suggestions and a size of the suggestion area of a GUI of the computing device of the user. For example, a ranking may be reflected in a number of points where a higher ranking means higher point values. For example, if the user's computing device only displays a single line of suggestions and a total of 30 characters the suggestion ranking component 995 may select the suggestions that maximize the total points given the space constraints and suggestion size. This means that a higher ranking but longer suggestion may be bumped for two shorter suggestions that add up to a higher total than the longer suggestion.

In some examples, the suggestions selected by the suggestion ranking component 995 may comprise different types of suggestions. For example, a content suggestion, an action suggestion, and a smart reply suggestion may all be suggested at the same time. As previously noted, the system may record interactions with the given suggestions and the system may use this feedback to learn how to better rank the suggestions. In some examples, this feedback may be shared with the intent model 897 to allow the intent model to better learn the user's communicative intent. Thus a user's interaction with a particular suggestion provides both an indication as to how suggestions should be ranked and also provides an indication as to whether the communicative intent determined by the intent models correctly identified the intent of the communication. Lack of interaction with suggestions also indicates that those suggestions may be deprioritized and that the intent model was incorrect in its determination of communicative intent.

In some examples, interactions with suggestions may be handled at the user's computing device. For example, any information needed for the interaction may be provided by the suggestion service when sending the suggestion. Upon selecting the suggestion, the user's computing device then displays this information. In some examples, the suggestion service may provide a. link to obtain the information needed to handle any interactions rather than the information itself. For example, for actions, the suggestion service may provide a link and information on how to implement the action. For example, a link to a calendar service for reminders. The suggestion service may create a message that the user's computing device may send to a network address indicated by the suggestion service (e.g., a calendar or reminder service) to create the reminder. This allows for distributed processing of action suggestions (distributed to the end points—i.e., the user devices) but at the same time allowing for flexibly adding new actions.

Figure 10:
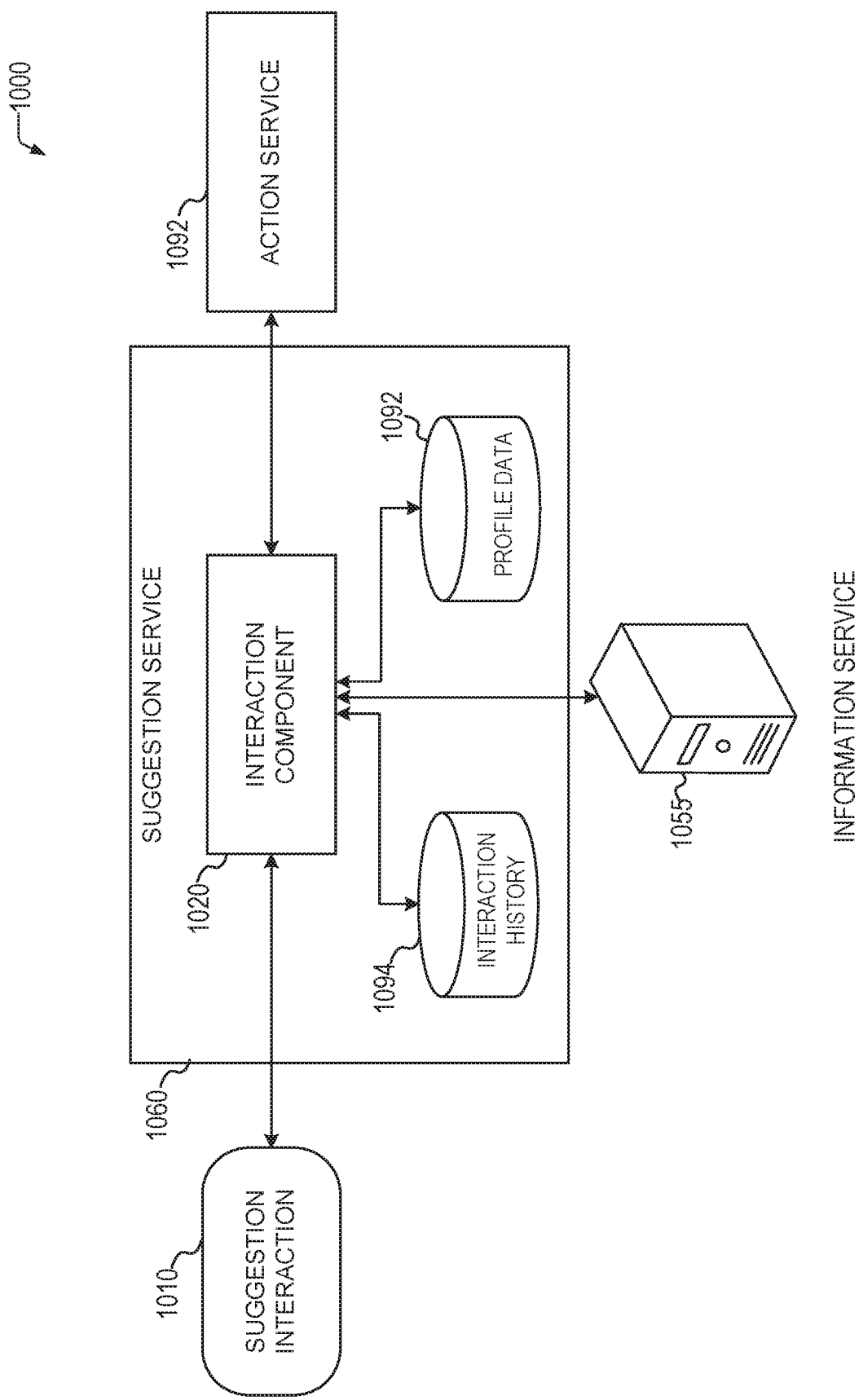
FIG. 10 shows a data flow of generating a suggestion according to some examples of the present disclosure.

Interactions may utilize the suggestion service to assist in providing the interaction. Turning now to FIG. 10, a data flow of a suggestion generation 1000 is shown according to some examples of the present disclosure. Suggestion service 1060 may be an example of suggestion service 960 and 860 according to some examples of the present disclosure. An interaction with a suggestion 1010 is received at the suggestion service 1060 by the interaction component 1020. Interaction component 1020 may respond with additional information regarding the suggestion or additional context. For example, movies in the area of the user, additional context, and the like. In some examples, this additional information may be obtained from an information service 1055 (which may be an example of information service 955, 855). The user may interact with this additional content, such as by selecting a movie and receiving more content about the movie. This ensures a premium user experience without the user having to leave the user interface of the communication program. The interactions and the additional content may be created with the help of the profile data 1092 and interaction history 1094. Profile data 1092 may be an example of profile data 992 of FIG. 9. Interaction history 1094 may be an example of interaction history 994 of FIG. 9. Upon interacting with a suggestion, the interaction component 1020 may update the interaction history 1094 so indicate the interaction so the suggestion ranking component may update its user based model.

Interaction component 1020 may interact with an action service 1092. Action service 1092 may be an example of action service 892 of FIG. 8. Interaction component 1020 may consult with action service 1092 to provide content and interactions associated with the suggestions. For example, to provide movie times, restaurant listings, and the like. Interaction component 1020 may also interface with action service 1092 to implement any action suggestions selected by the user. For example, booking a table at a restaurant, calling a cab, or the like.

Figure 11:
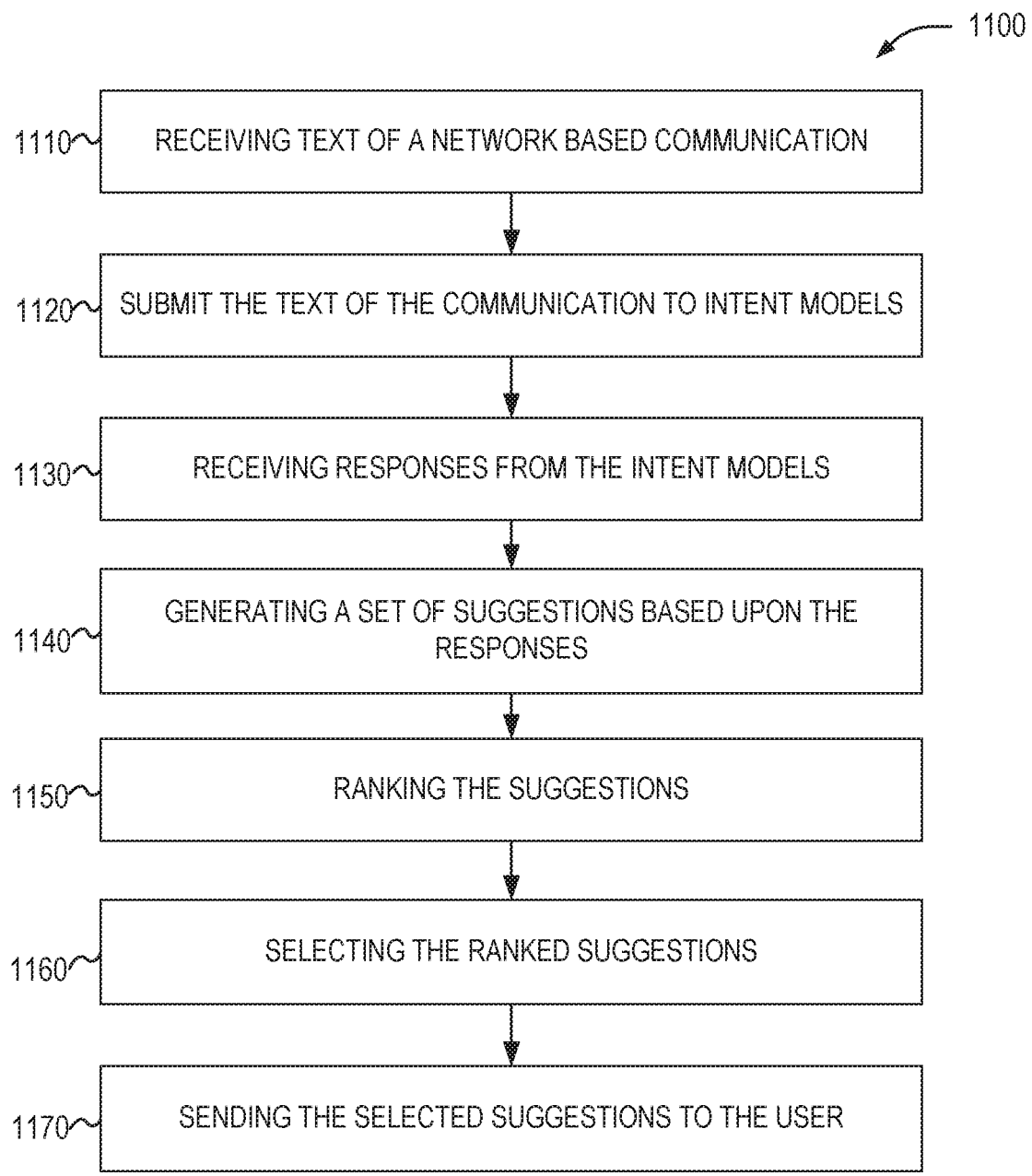
FIG. 11 shows a flowchart of a method of providing personalized suggestions according to some examples of the present disclosure.

Turning now to FIG. 11 a flowchart of a method 1100 of providing personalized suggestions is shown according to some examples of the present disclosure. FIG. 11 may be implemented by the suggestion service (e.g., suggestion service 860, 960, 1060). At operation 1110 the suggestion service may receive text of a communication between users of a network-based communication service. The communication may have been received by the user from another user or sent by the user to another user.

At operation 1120 the text of the communication may be submitted to one or more intent models. Each of the intent models testing the text of the communication for a different type of communicative intent. Submitting the text includes sending the text to the model over a network (e.g., network 815) if the model is not part of the suggestion service. The model may execute on one or more computing devices. At operation 1130 the responses from the model are received. The response may indicate a calculated communicative intent of the communication. For example, an intent to make an appointment, view information associated with an identified entity (person, place, or thing) in the communication, or the like. At operation 1140, the system may generate a set of suggestions based upon the responses. Suggestions may be generated using a mapping between intents and suggestions or a set of rules. In other examples, a machine learning classification algorithm such as a multiclass logistic regression algorithm, a multiclass neural network, a multiclass decision forest, or the like may learn appropriate suggestions based upon returned intents. The machine learning algorithm may utilize training data from users that identify appropriate suggestions based upon the learned intent of the communication.

At operation 1150 the suggestions may be ranked. As noted, the suggestions may be ranked based upon heuristic models, global system-wide models, and user-specific models. The models may learn based upon feedback given to suggestions in the form of interacting with the suggestions (or not interacting with the suggestions). In some examples, the heuristic models may setup a priority ordering based upon suggestion type. The global model and the user specific models may modify these rules based upon user interactions. In other examples, other machine learning models may be utilized such as logistic regression, linear regression, neural networks, decision trees, decision forests, and the like. These models may be initially trained using the heuristic model, then the model may be refined using first the global interaction data and then user specific interaction data. These models may produce a relevancy score based upon prior interactions with suggestions (either using only the suggestion type and/or the suggestion content itself). Suggestions may be ranked based upon the relevancy score (e.g., highest scores may be ranked highest). By starting with a set of heuristics, the initial users of the system may experience a baseline ranking performance that is then trained by both the global user base and the user's own preferences and selections. The use of both individual and system-wide interactions provides a greater amount of training data to increase the model accuracy. Once enough individualized interaction data is obtained, this interaction data may be weighted more heavily in training the model so as to customize the rankings for the user.

In some examples at operation 1150, previously delivered suggestions may also be ranked. These suggestions may be kept active for a predetermined period of time to allow the user the opportunity to select them in a fast-moving conversation. For example, without persisting previously delivered suggestions, these suggestions may be quickly be buried. In these examples, old suggestions are continued for a time to allow the user to respond. Once a predetermined time period is over, the relevance of the past suggestion is decreased using a time decay function.

At operation 1160 the suggestions may be selected. For example, the top percentage or number of suggestions based upon rank (e.g., top 5, or top 10%). As noted, if the computing device has limited space a function may be applied to maximize the utility of the selections. At operation 1170 the suggestions may be sent to the user. As noted, additional communications between the system and the computing device of the user may deliver additional information and content and assist the user in taking suggested actions.

Figure 12:
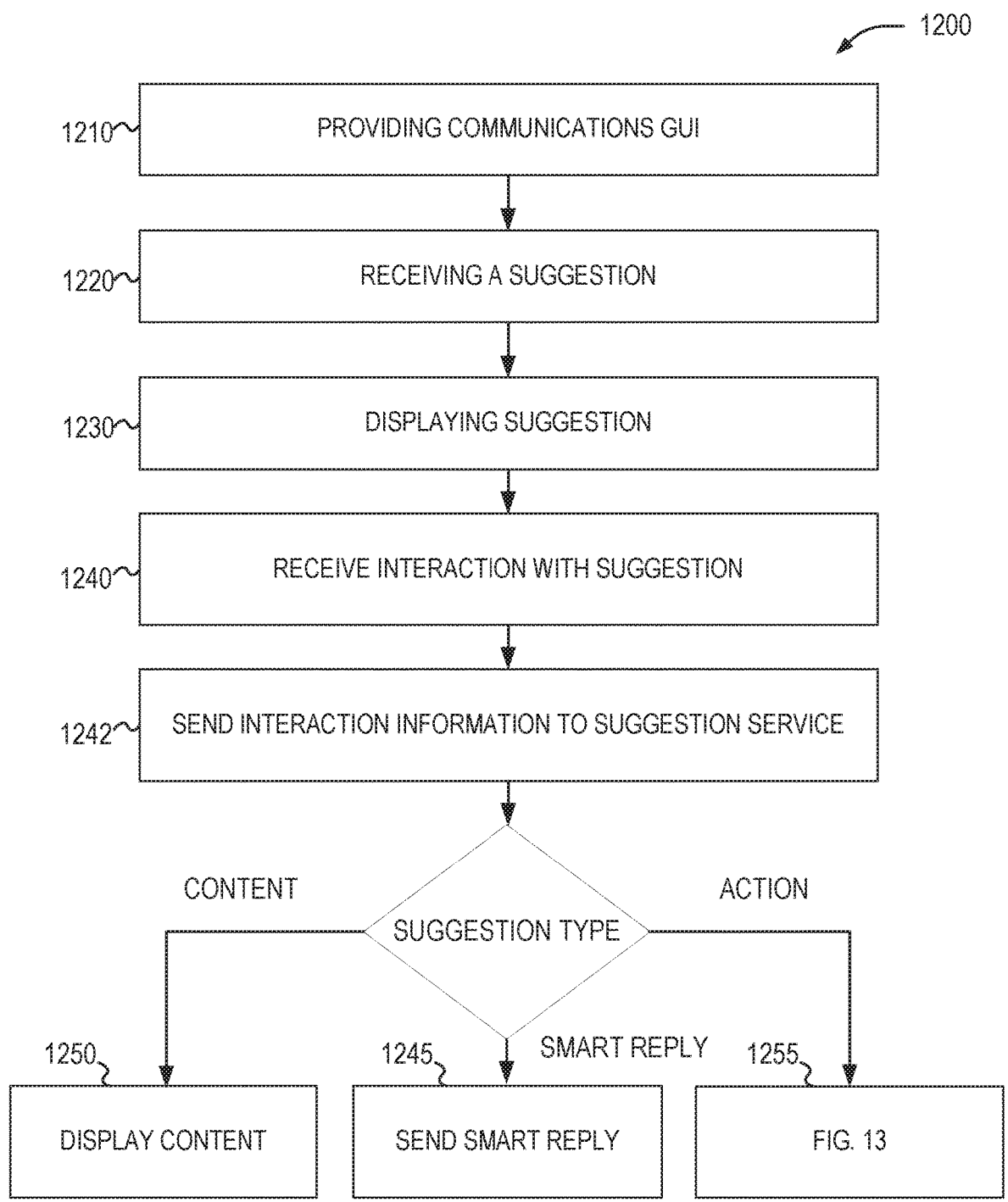
FIG. 12 shows a flowchart of a method for providing suggestions in a communication session of a network-based communication service according to some examples of the present disclosure.

Turning now to FIG. 12, a flowchart of a method 1200 for providing suggestions in a communication session of a network-based communication service is shown according to some examples of the present disclosure. FIG. 12 may be performed by the computing device of the users of the communication session, for example, computing devices 805, 810 of FIG. 8, (e.g., the communication application 825). At operation 1210 the computing device may provide a communications GUI for utilizing the network-based communication service. At operation 1220 the computing device may receive one or more suggestions from a suggestion service. At operation 1230 the suggestions may be displayed in the order specified (e.g., based upon the rank)

by the suggestion service. At operation 1240 the computing device may receive an interaction with one of the suggestions. At operation 1242, an indication of the interaction may be sent to the suggestion service (e.g., to tune the ranking models). If the interaction is a smart reply and the user has selected the smart reply, at operation 1245 the computing device may send the smart reply. At operation 1250 if the suggestion was a content suggestion the computing device may display the content. In some examples, prior to displaying the content, the application may contact the suggestion service to obtain the content. At operation 1255 if the suggestion was an action suggestion, flow proceeds to FIG. 13.

Figure 13:
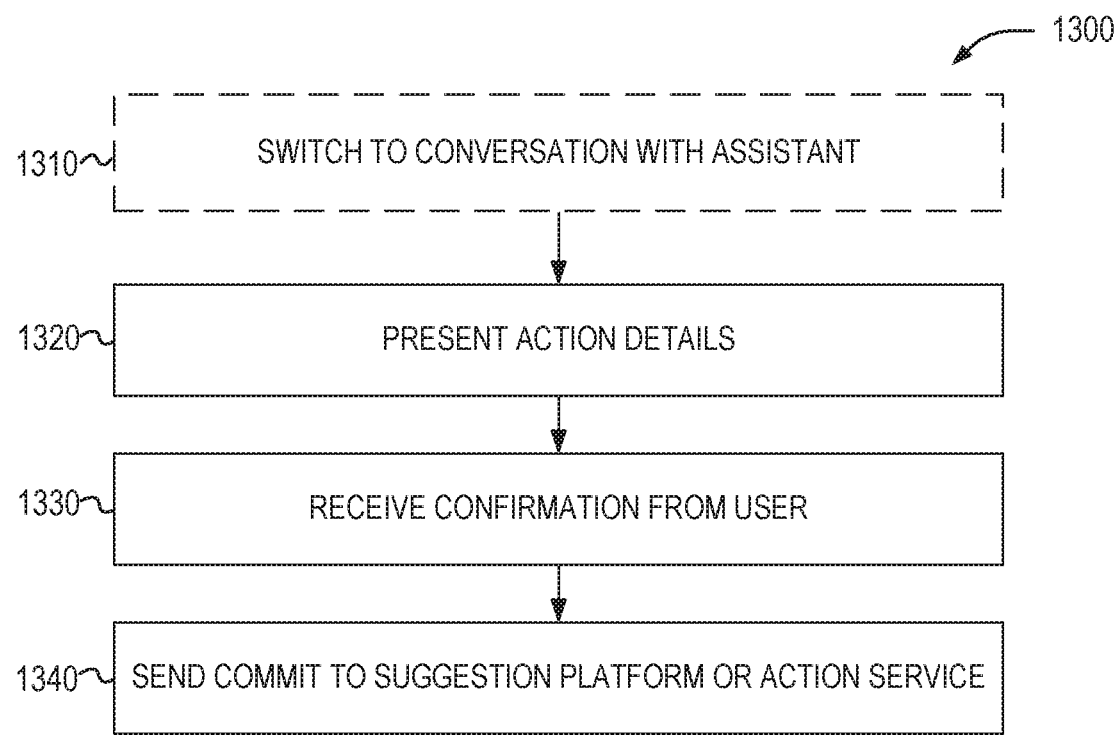
FIG. 13 shows a flowchart of a method of handling an interaction with an action suggestion according to some examples of the present disclosure.

Turning now to FIG. 13, a flowchart of a method of handling an interaction with an action suggestion 1300 is shown according to some examples of the present disclosure. Optionally at operation 1310, the GUI may switch to presenting a conversation window between the user and the personal digital assistant, while the original conversation continues in the background. At operation 1320 the action details may be presented. For example, in the case of a dinner reservation, reservation details may be presented and the user may confirm them. In the case of a product purchase, details of the product, payment information selections, and shipping information may be shown and the user may confirm them. At operation 1330 the computing device may receive the confirmation from the user. At operation 1340 the computing device may send a commit instruction to commit the action to either the suggestion service or directly to the action service.

Figure 14:
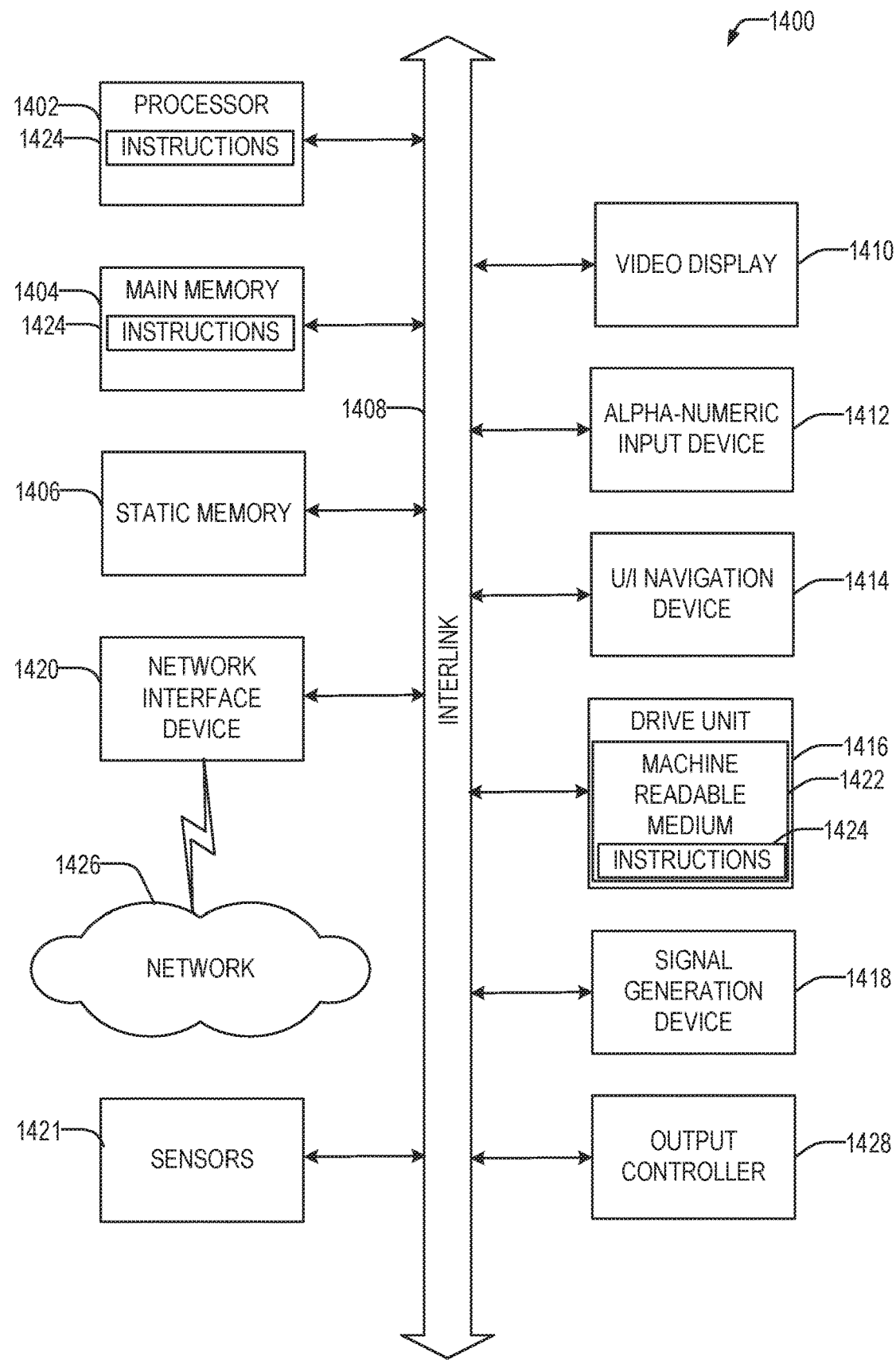
FIG. 14 is a block diagram illustrating an example of a machine upon which one or more embodiments may be implemented according to some examples of the present disclosure.

FIG. 14 illustrates a block diagram of an example machine 1400 upon which any one or more of the techniques (e.g., methodologies) discussed herein may perform. In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a computing device such as a server, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. For example, the GUIs in FIGS. 1-7 may be created, rendered, and displayed by a machine 1400. Additionally, machine 1400 may implement any of the components of FIGS. 8, 9, and 10 and implement the methods of FIGS. 11-13. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, applications, or mechanisms. components, modules, applications, or mechanisms are tangible entities (e.g., hardware) capable of performing specified operations and may be configured or arranged in a certain manner. In an example, circuits may be arranged (e.g., internally or with respect to external entities such as other circuits) in a specified manner as components, modules, applications, or mechanisms. In an example, the whole or part of one or more computer systems (e.g., a standalone, client or server computer system) or one or more hardware processors may be configured by firmware or software (e.g., instructions, an application portion, or an application) as components, modules, applications, or mechanisms that operate to perform specified operations. In an example, the software may reside on a machine readable medium. In an example, the software, when executed by the underlying hardware of the component, module, application, or mechanism, causes the hardware to perform the specified operations.

Accordingly, the terms "module," "component," "application," or "mechanism" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules, components, applications, or mechanisms are temporarily configured, each of them need not be instantiated at any one moment in time. For example, where the modules, components, applications, or mechanisms comprise a general-purpose hardware processor configured using software the general-purpose hardware processor may be configured as respective different modules, components, applications, or mechanisms at different times. Software may accordingly configure a hardware processor, for example, to constitute a particular module, component, application, or mechanism at one instance of time and to constitute a different module, component, application, or mechanism at a different instance of time.

Machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The machine 1400 may further include a display unit 1410, an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a storage device (e.g., drive unit) 1416, a signal generation device 1418 (e.g., a speaker), a network interface device 1420, and one or more sensors 1421, such as a global positioning system (GPS) sensor, compass, accelerometer, or other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the storage device 1416 may constitute machine readable media.

While the machine readable medium 1422 is illustrated as a single medium, the term "machine readable medium" may include a single medium or multiple media (e.g., a centralized or distributed database, and/or associated caches and servers) configured to store the one or more instructions 1424.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1424 may further be transmitted or received over a communications network 1426 using a transmission medium via the network interface device 1420. The machine 1400 may communicate with one or more other machines utilizing any one of a number of transfer protocols (e.g., frame relay, interact protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1420 may include one or more physical jacks (e.g., Ethernet, coaxial, or phone jacks) or one or more antennas to connect to the communications network 1426. In an example, the network interface device 1420 may include a plurality of antennas to wirelessly communicate using at least one of single-input multiple-output (SIMO), multiple-input multiple-output (MIMO), or multiple-input single-output (MISO) techniques. In some examples, the network interface device 1420 may wirelessly communicate using Multiple User MIMO techniques.

OTHER NOTES AND EXAMPLES

Example 1 is a machine-readable medium that stores instructions which when performed by a machine, cause the machine to perform operations comprising: receiving, over a network, text of a network-based communication between a first user of a first device and a second user of a second device; inputting the text of the communication to a plurality of intent models, each intent model testing the text for a different type of communicative intent; receiving a set of one or more responses from one or more of the plurality of intent models, each response in the set indicating a calculated communicative intent of the communication; generating a set of personalized suggestions based upon both the set of responses and a user profile of the first user; ranking the set of suggestions relative to one another based upon a global model and a user model, the user model specific to preferences of the first user of the first device; selecting a first and a second suggestion from the set of suggestions based upon the ranking, the first and second suggestions being different suggestion types; and sending the first and second suggestion to the first device for presentation to the first user.

In Example 2, the subject matter of Example 1 optionally includes wherein the operations of generating the set of personalized suggestions comprises generating a suggestion in the set of personalized suggestions based upon a preference in the user profile corresponding to the suggestion.

In Example 3, the subject matter of any one or more of Examples 1-2 optionally include wherein the first suggestion is an action suggestion and wherein the operations further comprise: receiving a confirmation input from the first device that the first user has selected a Graphical User Interface (GUI) element on the first device indicating a desire to perform an action corresponding to the action suggestion; and responsive to receiving the confirmation input, sending a message to a computing device to implement the action.

In Example 4, the subject matter of Example 3 optionally includes wherein the action suggestion is a reminder for a particular time and wherein the computing device is a reminder service and the message sets a reminder for the particular time.

In Example 5, the subject matter of any one or more of Examples 3-4 optionally include wherein the action suggestion is a calendar event.

In Example 6, the subject matter of any one or more of Examples 3-5 optionally include wherein the action suggestion is a presentation of a document mentioned in the text of the communication.

In Example 7, the subject matter of any one or more of Examples 1-6 optionally include wherein the first suggestion is a content suggestion and wherein the operations further comprise: receiving a confirmation input from the first device that the first user has selected a Graphical User Interface (GUI) element on the first device indicating a desire to receive content suggested by the content suggestion; and responsive to receiving the confirmation input, sending the content to the first device.

In Example 8, the subject matter of any one or more of Examples 1-7 optionally include wherein the first suggestion is a reply suggestion and wherein the operations further comprise: receiving a confirmation input from the first device that the first user has selected a Graphical User Interface (GUI) element on the first device indicating a desire to receive content suggested by the first suggestion; and responsive to receiving the confirmation input, sending a reply text corresponding to the reply suggestion to a communications service hosting the network-based communication.

In Example 9, the subject matter of Example 8 optionally includes wherein the communications service is a network-based chat service.

In Example 10, the subject matter of any one or more of Examples 1-9 optionally include wherein the operations further comprise: receiving a confirmation input from the first device that the first user has selected a Graphical User Interface (GUI) element on the first device indicating a desire to interact with the first suggestion; and responsive to receiving the confirmation input, causing a secondary GUI display to open in the first device and presenting options for the first user to select.

In Example 11, the subject matter of any one or more of Examples 1-10 optionally include wherein a model of the plurality of intent models is a machine learning model.

In Example 12, the subject matter of Example 11 optionally includes wherein the model is updated based upon user interactions with the first and second suggestion.

In Example 13, the subject matter of any one or more of Examples 1-12 optionally include wherein generating the set of suggestions comprises: determining, for a particular response in the set of one or more responses, a suggestion based upon a predetermined suggestion for a type of the particular response.

In Example 14, the subject matter of any one or more of Examples 1-13 optionally include wherein the operations further comprise: populating the first suggestion with content based upon the user profile of the first user and information determined from a network-based service corresponding to the first suggestion.

In Example 15, the subject matter of any one or more of Examples 1-14 optionally include wherein the operations for ranking the set of suggestions relative to one another comprises: utilizing a set of heuristics, the set of heuristics applying a priority based ordering based upon type of suggestions.

In Example 16, the subject matter of Example 15 optionally includes wherein the operations for ranking the set of suggestions relative to one another comprises: modifying a ranking produced by the set of heuristics based upon histories of interaction between a plurality of users and a plurality of suggestion types, the plurality of users including the first user and the second user and at least one third user, the third user not part of the network-based communication between the first and second user.

In Example 17, the subject matter of Example 16 optionally includes wherein the operations for ranking the set of suggestions relative to one another comprises: modifying a ranking produced by the set of heuristics based upon both the interaction history with the plurality of users and interaction history with the first user, the interaction history recording interactions with previous suggestions.

In Example 18, the subject matter of any one or more of Examples 1-17 optionally include wherein the operations of selecting the first and second suggestions from the set of suggestions comprises selecting the first and second suggestions from the set of suggestions based upon a maximization of the ranking of selected suggestions given a constraint that all selected suggestions fit in a constrained area of a display of the first device.

In Example 19, the subject matter of any one or more of Examples 1-18 optionally include wherein the operations of selecting the first and second suggestions from the set of suggestions comprises selecting two suggestions of different types from the set of suggestions, the types of suggestions comprising: an action suggestion, a reply suggestion, and a content suggestion.

In Example 20, the subject matter of any one or more of Examples 1-19 optionally include wherein the operations comprise sending the first suggestion to the first device for presentation to the first user, but not sending the first suggestion to the second device for presentation to the second user.

In Example 21, the subject matter of any one or more of Examples 1-20 optionally include wherein the operations comprise sending the first suggestion to the first device for presentation to the first user and sending the first suggestion to the second device for presentation to the second user.

In Example 22, the subject matter of any one or more of Examples 1-21 optionally include wherein the set of suggestions includes a previously sent suggestion and wherein the operations of ranking the set of suggestions relative to one another based upon the global model and the user model comprises ranking the previously sent suggestion higher to allow the user time to select the suggestion.

In Example 23, the subject matter of Example 22 optionally includes wherein the operations comprise removing the previously sent suggestion after a particular period of time.

In Example 24, the subject matter of any one or more of Examples 1-23 optionally include wherein communicative intent comprises an intent to one of go to a restaurant, get directions, set a calendar reminder, go to a movie, call a car service, call a taxi, share an address, determine details about an entity, and add a contact.

Example 25 is a computer-implemented method for providing personalized suggestions, the method comprising: using a computer processor: receiving, over a network, text of a network-based communication between a first user of a first device and a second user of a second device; inputting the text of the communication to a plurality of intent models, each intent model testing the text for a different type of communicative intent; receiving a set of one or more responses from one or more of the plurality of intent models, each response in the set indicating a calculated communicative intent of the communication; generating a set of suggestions based upon both the set of responses and a user profile of the first user; ranking the set of suggestions relative to one another based upon a global model and a user model, the user model specific to the first user of the first device; selecting a first and a second suggestion from the set of suggestions based upon the ranking, the first and second suggestions being different suggestion types; and sending the first and second suggestion to the first device for presentation to the first user.

In Example 26, the subject matter of Example 25 optionally includes wherein generating the set of personalized suggestions comprises generating a suggestion in the set of personalized suggestions based upon a preference in the user profile corresponding to the suggestion.

In Example 27, the subject matter of any one or more of Examples 25-26 optionally include wherein the first suggestion is an action suggestion and wherein the method further comprises: receiving a confirmation input from the first device that the first user has selected a Graphical User Interface (GUI) element on the first device indicating a desire to perform an action corresponding to the action suggestion; and responsive to receiving the confirmation input, sending a message to a computing device to implement the action.

In Example 28, the subject matter of Example 27 optionally includes wherein the action suggestion is a reminder for a particular time and wherein the computing device is a reminder service and the message sets a reminder for the particular time.

In Example 29, the subject matter of any one or more of Examples 27-28 optionally include wherein the action suggestion is a calendar event.

In Example 30, the subject matter of any one or more of Examples 27-29 optionally include wherein the action suggestion is a presentation of a document mentioned in the text of the communication.

In Example 31, the subject matter of any one or more of Examples 25-30 optionally include wherein the first suggestion is a content suggestion and wherein the method further comprises: receiving a confirmation input from the first device that the first user has selected a Graphical User Interface (GUI) element on the first device indicating a desire to receive content suggested by the content suggestion; and responsive to receiving the confirmation input, sending the content to the first device.

In Example 32, the subject matter of any one or more of Examples 25-31 optionally include wherein the first suggestion is a reply suggestion and wherein the method further comprises: receiving a confirmation input from the first device that the first user has selected a Graphical User Interface (GUI) element on the first device indicating a desire to receive content suggested by the first suggestion; and responsive to receiving the confirmation input, sending a reply text corresponding to the reply suggestion to a communications service hosting the network-based communication.

In Example 33, the subject matter of Example 32 optionally includes wherein the communications service is a network-based chat service.

In Example 34, the subject matter of any one or more of Examples 25-33 optionally include wherein the method further comprises: receiving a confirmation input from the first device that the first user has selected a Graphical User Interface (GUI) element on the first device indicating a desire to interact with the first suggestion; and responsive to receiving the confirmation input, causing a secondary GUI display to open in the first device and presenting options for the first user to select.

In Example 35, the subject matter of any one or more of Examples 25-34 optionally include wherein a model of the plurality of intent models is a machine learning model.

In Example 36, the subject matter of Example 35 optionally includes wherein the model is updated based upon user interactions with the first and second suggestion.

In Example 37, the subject matter of any one or more of Examples 25-36 optionally include wherein generating the set of suggestions comprises: determining, for a particular response in the set of one or more responses, a suggestion based upon a predetermined suggestion for a type of the particular response.

In Example 38, the subject matter of any one or more of Examples 25-37 optionally include wherein the method further comprises: populating the first suggestion with content based upon the user profile of the first user and information determined from a network-based service corresponding to the first suggestion.

In Example 39, the subject matter of any one or more of Examples 25-38 optionally include wherein ranking the set of suggestions relative to one another comprises: utilizing a set of heuristics, the set of heuristics applying a priority based ordering based upon type of suggestions.

In Example 40, the subject matter of Example 39 optionally includes wherein ranking the set of suggestions relative to one another comprises: modifying a ranking produced by the set of heuristics based upon histories of interaction between a plurality of users and a plurality of suggestion types, the plurality of users including the first user and the second user and at least one third user, the third user not part of the network-based communication between the first and second user.

In Example 41, the subject matter of Example 40 optionally includes wherein ranking the set of suggestions relative to one another comprises: modifying a ranking produced by the set of heuristics based upon both the interaction history with the plurality of users and interaction history with the first user, the interaction history recording interactions with previous suggestions.

In Example 42, the subject matter of any one or more of Examples 25-41 optionally include wherein selecting the first and second suggestions from the set of suggestions comprises selecting the first and second suggestions from the set of suggestions based upon a maximization of the ranking of selected suggestions given a constraint that all selected suggestions fit in a constrained area of a display of the first device.

In Example 43, the subject matter of any one or more of Examples 25-42 optionally include wherein selecting the first and second suggestions from the set of suggestions comprises selecting two suggestions of different types from the set of suggestions, the types of suggestions comprising: an action suggestion, a reply suggestion, and a content suggestion.

In Example 44, the subject matter of any one or more of Examples 25-43 optionally include wherein the method comprises sending the first suggestion to the first device for presentation to the first user, but not sending the first suggestion to the second device for presentation to the second user.

In Example 45, the subject matter of any one or more of Examples 25-44 optionally include wherein the method comprises sending the first suggestion to the first device for presentation to the first user and sending the first suggestion to the second device for presentation to the second user.

In Example 46, the subject matter of any one or more of Examples 25-45 optionally include wherein the set of suggestions includes a previously sent suggestion and wherein ranking the set of suggestions relative to one another based upon the global model and the user model comprises ranking the previously sent suggestion higher to allow the user time to select the suggestion.

In Example 47, the subject matter of Example 46 optionally includes wherein the method comprises removing the previously sent suggestion after a particular period of time.

In Example 48, the subject matter of any one or more of Examples 25-47 optionally include wherein communicative intent comprises an intent to one of: go to a restaurant, get directions, set a calendar reminder, go to a movie, call a car service, call a taxi, share an address, determine details about an entity, and add a contact.

Example 49 is a system that for providing personalized suggestions, the system comprising: a processor; a memory, communicatively coupled to the processor and including instructions, which when performed by the processor, causes the machine to perform operations comprising: receiving, over a network, text of a network-based communication between a first user of a first device and a second user of a second device; inputting the text of the communication to a plurality of intent models, each intent model testing the text for a different type of communicative intent; receiving a set of one or more responses from one or more of the plurality of intent models, each response in the set indicating a calculated communicative intent of the communication; generating a set of suggestions based upon both the set of responses and a user profile of the first user; ranking the set of suggestions relative to one another based upon a global model and a user model, the user model specific to the first user of the first device; selecting a first and a second suggestion from the set of suggestions based upon the ranking, the first and second suggestions being different suggestion types; and sending the first and second suggestion to the first device for presentation to the first user.

In Example 50, the subject matter of Example 49 optionally includes wherein the operations of generating the set of personalized suggestions comprises generating a suggestion in the set of personalized suggestions based upon a preference in the user profile corresponding to the suggestion.

In Example 51, the subject matter of any one or more of Examples 49-50 optionally include wherein the first suggestion is an action suggestion and wherein the operations further comprise: receiving a confirmation input from the first device that the first user has selected a Graphical User Interface (GUI) element on the first device indicating a desire to perform an action corresponding to the action suggestion; and responsive to receiving the confirmation input, sending a message to a computing device to implement the action.

In Example 52, the subject matter of Example 51 optionally includes wherein the action suggestion is a reminder for a particular time and wherein the computing device is a reminder service and the message sets a reminder for the particular time.

In Example 53, the subject matter of any one or more of Examples 51-52 optionally include wherein the action suggestion is a calendar event.

In Example 54, the subject matter of any one or more of Examples 51-53 optionally include wherein the action suggestion is a presentation of a document mentioned in the text of the communication.

In Example 55, the subject matter of any one or more of Examples 49-54 optionally include wherein the first suggestion is a content suggestion and wherein the operations further comprise: receiving a confirmation input from the first device that the first user has selected a Graphical User Interface (GUI) element on the first device indicating a desire to receive content suggested by the content suggestion; and responsive to receiving the confirmation input, sending the content to the first device.

In Example 56, the subject matter of any one or more of Examples 49-55 optionally include wherein the first suggestion is a reply suggestion and wherein the operations further comprise: receiving a confirmation input from the first device that the first user has selected a Graphical User Interface (GUI) element on the first device indicating a desire to receive content suggested by the first suggestion; and responsive to receiving the confirmation input, sending a reply text corresponding to the reply suggestion to a communications service hosting the network-based communication.

In Example 57, the subject matter of Example 56 optionally includes wherein the communications service is a network-based chat service.

In Example 58, the subject matter of any one or more of Examples 49-57 optionally include wherein the operations further comprise: receiving a confirmation input from the first device that the first user has selected a Graphical User Interface (GUI) element on the first device indicating a desire to interact with the first suggestion; and responsive to receiving the confirmation input, causing a secondary GUI display to open in the first device and presenting options for the first user to select.

In Example 59, the subject matter of any one or more of Examples 49-58 optionally include wherein a model of the plurality of intent models is a machine learning model.

In Example 60, the subject matter of Example 59 optionally includes wherein the model is updated based upon user interactions with the first and second suggestion.

In Example 61, the subject matter of any one or more of Examples 49-60 optionally include wherein generating the set of suggestions comprises: determining, for a particular response in the set of one or more responses, a suggestion based upon a predetermined suggestion for a type of the particular response.

In Example 62, the subject matter of any one or more of Examples 49-61 optionally include wherein the operations further comprise: populating the first suggestion with content based upon the user profile of the first user and information determined from a network-based service corresponding to the first suggestion.

In Example 63, the subject matter of any one or more of Examples 49-62 optionally include wherein the operations for ranking the set of suggestions relative to one another comprises: utilizing a set of heuristics, the set of heuristics applying a priority based ordering based upon type of suggestions.

In Example 64, the subject matter of Example 63 optionally includes wherein the operations for ranking the set of suggestions relative to one another comprises: modifying a ranking produced by the set of heuristics based upon histories of interaction between a plurality of users and a plurality of suggestion types, the plurality of users including the first user and the second user and at least one third user, the third user not part of the network-based communication between the first and second user.

In Example 65, the subject matter of Example 64 optionally includes wherein the operations for ranking the set of suggestions relative to one another comprises: modifying a ranking produced by the set of heuristics based upon both the interaction history with the plurality of users and interaction history with the first user, the interaction history recording interactions with previous suggestions.

In Example 66, the subject matter of any one or more of Examples 49-65 optionally include wherein the operations of selecting the first and second suggestions from the set of suggestions comprises selecting the first and second suggestions from the set of suggestions based upon a maximization of the ranking of selected suggestions given a constraint that all selected suggestions fit in a constrained area of a display of the first device.

In Example 67, the subject matter of any one or more of Examples 49-66 optionally include wherein the operations of selecting the first and second suggestions from the set of suggestions comprises selecting two suggestions of different types from the set of suggestions, the types of suggestions comprising: an action suggestion, a reply suggestion, and a content suggestion.

In Example 68, the subject matter of any one or more of Examples 49-67 optionally include wherein the operations comprise sending the first suggestion to the first device for presentation to the first user, but not sending the first suggestion to the second device for presentation to the second user.

In Example 69, the subject matter of any one or more of Examples 49-68 optionally include wherein the operations comprise sending the first suggestion to the first device for presentation to the first user and sending the first suggestion to the second device for presentation to the second user.

In Example 70, the subject matter of any one or more of Examples 49-69 optionally include wherein the set of suggestions includes a previously sent suggestion and wherein the operations of ranking the set of suggestions relative to one another based upon the global model and the user model comprises ranking the previously sent suggestion higher to allow the user time to select the suggestion.

In Example 71, the subject matter of Example 70 optionally includes wherein the operations comprise removing the previously sent suggestion after a particular period of time.

In Example 72. the subject matter of any one or more of Examples 49-71 optionally include wherein communicative intent comprises an intent to one of: go to a restaurant, get directions, set a calendar reminder, go to a movie, call a car service, call a taxi, share an address, determine details about an entity, and add a contact.

What is claimed is:

1. A non-transitory machine readable medium that stores instructions which when performed by a machine, cause the machine to perform operations comprising:
receiving, over a network, text of a network-based communication between a first user of a first device and a second user of a second device;
inputting the text of the communication to a plurality of intent models, each intent model trained to detect a unique type of communicative intent in communication texts, wherein the communicative intent is a semantic meaning of the text of the communication that supports identifying suggestions associated with the following suggestion types: an action suggestion type, a content suggestion type, and a reply suggestion type;
receiving a set of one or more responses from one or more of the plurality of intent models, each response in the set indicating a calculated communicative intent of the communication;
generating a set of suggestions based upon both the set of responses and a user profile of the first user;
ranking the set of suggestions relative to one another based upon a global model and a user model, the user model specific to preferences of the first user of the first device and customized based upon past selection history of suggestions of the first user, the global model based upon past selection history of a plurality of users;
selecting a first suggestion and a second suggestion from the set of suggestions based upon the ranking, wherein the first suggestion is a first suggestion type and the second suggestion is a second suggestion type, the first suggestion type and the second suggestion type being different suggestion types; and
sending the first suggestion and the second suggestion to the first device for presentation to the first user.

2. The machine-readable medium of claim 1, wherein the first suggestion is an action suggestion of the action suggestion type and wherein the operations further comprise:
receiving a confirmation input from the first device that the first user has selected a Graphical User Interface (GUI) element on the first device indicating a desire to perform an action corresponding to the action suggestion; and
responsive to receiving the confirmation input, sending a message to a computing device to implement the action.

3. The machine-readable medium of claim 2, wherein the action suggestion is a reminder for a particular time and wherein the computing device is a reminder service and the message sets a reminder for the particular time.

4. The machine-readable medium of claim 1, wherein the first suggestion is a content suggestion of the content suggestion type and wherein the operations further comprise:
receiving a confirmation input from the first device that the first user has selected a Graphical User Interface (GUI) element on the first device indicating a desire to receive content suggested by the content suggestion; and
responsive to receiving the confirmation input, sending the content to the first device.

5. The machine-readable medium of claim 1, wherein the first suggestion is a reply suggestion of the reply suggestion type and wherein the operations further comprise:
receiving a confirmation input from the first device that the first user has selected a Graphical User Interface (GUI) element on the first device indicating a desire to send content suggested by the first suggestion; and
responsive to receiving the confirmation input, sending a reply text corresponding to the reply suggestion to a communications service hosting the network-based communication.

6. The machine-readable medium of claim 1, wherein the operations further comprise:
populating the first suggestion with content based upon the user profile of the first user and information determined from a network-based service corresponding to the first suggestion.

7. The machine-readable medium of claim 1, wherein the operations for ranking the set of suggestions relative to one another comprises:
utilizing a set of heuristics, the set of heuristics applying a priority based ordering based upon type of suggestions including the action suggestion type, the content suggestion type, and the reply suggestion type.

8. A computer-implemented method for providing personalized suggestions, the method comprising:
using a computer processor:
receiving, over a network, text of a network-based communication between a first user of a first device and a second user of a second device;
inputting the text of the communication to a plurality of intent models, each intent model specifically trained to detect a unique type of communicative intent in communication texts, wherein the communicative intent is a semantic meaning of the text of the communications that supports identifying suggestions associated with the following suggestion types: an action suggestion type, a content suggestion type, and a reply suggestion type;
receiving a set of one or more responses from one or more of the plurality of intent models, each response in the set indicating a calculated communicative intent of the communication;
generating a set of suggestions based upon both the set of responses and a user profile of the first user;
ranking the set of suggestions relative to one another based upon a global model and a user model, the user model specific to preferences of the first user of the first device and customized based upon past selection history of suggestions of the first user, the global model based upon past selection history of a plurality of users;
selecting a first suggestion and a second suggestion from the set of suggestions based upon the ranking, wherein the first suggestion is a first suggestion type and the second suggestion is a second suggestion type, the first suggestion type and the second suggestion type being different suggestion types; and
sending the first suggestion and the second suggestion to the first device for presentation to the first user.

9. The method of claim 8, wherein the first suggestion is an action suggestion of the action suggestion type and wherein the method further comprises:
receiving a confirmation input from the first device that the first user has selected a Graphical User Interface (GUI) element on the first device indicating a desire to perform an action corresponding to the action suggestion; and responsive to receiving the confirmation input, sending a message to a computing device to implement the action.

10. The method of claim 9, wherein the action suggestion is a reminder for a particular time and wherein the computing device is a reminder service and the message sets a reminder for the particular time.

11. The method of claim 8, wherein the first suggestion is a content suggestion of the content suggestion type and wherein the method further comprises:
receiving a confirmation input from the first device that the first user has selected a Graphical User Interface (GUI) element on the first device indicating a desire to receive content suggested by the content suggestion; and responsive to receiving the confirmation input, sending the content to the first device.

12. The method of claim 8, wherein the first suggestion is a reply suggestion of the reply suggestion type and wherein the method further comprises:
receiving a confirmation input from the first device that the first user has selected a Graphical User Interface (GUI) element on the first device indicating a desire to send content suggested by the first suggestion; and responsive to receiving the confirmation input, sending a reply text corresponding to the reply suggestion to a communications service hosting the network-based communication.

13. The method of claim 12, wherein the communications service is a network-based chat service.

14. A system for providing personalized suggestions, the system comprising:
a processor;
a memory, communicatively coupled to the processor and including instructions, which when performed by the processor, causes the system to perform operations comprising:
receiving, over a network, text of a network-based communication between a first user of a first device and a second user of a second device;
inputting the text of the communication to a plurality of intent models, each intent model trained to detect a unique type of communicative intent in communication texts, wherein the communicative intent is a semantic meaning of the text of the communications that supports identifying suggestions associated with the following suggestion types: an action suggestion type, a content suggestion type, and a reply suggestion type;
receiving a set of one or more responses from one or more of the plurality of intent models, each response in the set indicating a calculated communicative intent of the communication;
generating a set of suggestions based upon both the set of responses and a user profile of the first user;
ranking the set of suggestions relative to one another based upon a global model and a user model, the user model specific to preferences of the first user of the first device and customized based upon past selection history of suggestions of the first user, the global model based upon past selection history of a plurality of users;

selecting a first suggestion and a second suggestion from the set of suggestions based upon the ranking, wherein the first suggestion is a first suggestion type and the second suggestion is a second suggestion type, the first suggestion type and the second suggestion type being different suggestion types; and sending the first suggestion and the second suggestion to the first device for presentation to the first user.

15. The system of claim 14, wherein the first suggestion is an action suggestion of the action suggestion type and wherein the operations further comprise:
receiving a confirmation input from the first device that the first user has selected a Graphical User Interface (GUI) element on the first device indicating a desire to perform an action corresponding to the action suggestion; and responsive to receiving the confirmation input, sending a message to a computing device to implement the action.

16. The system of claim 15, wherein the action suggestion type is a reminder for a particular time and wherein the computing device is a reminder service and the message sets a reminder for the particular time.

17. The system of claim 14, wherein the first suggestion is a content suggestion of the content suggestion type and wherein the operations further comprise:
receiving a confirmation input from the first device that the first user has selected a Graphical User Interface (GUI) element on the first device indicating a desire to receive content suggested by the content suggestion type; and responsive to receiving the confirmation input, sending the content to the first device.

18. The system of claim 14, wherein the first suggestion is a reply suggestion of the reply suggestion type and wherein the operations further comprise:
receiving a confirmation input from the first device that the first user has selected a Graphical User Interface (GUI) element on the first device indicating a desire to send content suggested by the first suggestion; and responsive to receiving the confirmation input, sending a reply text corresponding to the reply suggestion to a communications service hosting the network-based communication.

19. The system of claim 14, wherein the operations for ranking the set of suggestions relative to one another comprises:
utilizing a set of heuristics, the set of heuristics applying a priority based ordering based upon type of suggestions including the action suggestion type, the content suggestion type, and the reply suggestion type.

20. The system of claim 19, wherein the operations for ranking the set of suggestions relative to one another comprises:
modifying a ranking produced by the set of heuristics based upon histories of interaction between a plurality of users and a plurality of suggestion types, the plurality of users including the first user and the second user and at least one third user, the third user not part of the network-based communication between the first and second user.

* * * * *